United States Patent
Kamiyama et al.

(10) Patent No.: US 8,694,897 B2
(45) Date of Patent: Apr. 8, 2014

(54) LAYOUT CONVERTER, LAYOUT CONVERSION PROGRAM, AND LAYOUT CONVERSION METHOD

(75) Inventors: Yoshiroh Kamiyama, Kanagawa (JP); Atsushi Ono, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 13/040,843

(22) Filed: Mar. 4, 2011

(65) Prior Publication Data

US 2011/0225522 A1    Sep. 15, 2011

(30) Foreign Application Priority Data

Mar. 12, 2010  (JP) ................................ 2010-056530

(51) Int. Cl.
*G06F 3/0481*    (2013.01)
(52) U.S. Cl.
USPC ............................ 715/762; 715/763; 715/788
(58) Field of Classification Search
USPC ...................................................... 715/762
See application file for complete search history.

(56) References Cited

U.S. PATENT DOCUMENTS

| | | | | |
|---|---|---|---|---|
| 5,911,145 | A * | 6/1999 | Arora et al. .................... | 715/207 |
| 6,016,145 | A * | 1/2000 | Horvitz et al. ................. | 715/788 |
| 6,072,949 | A * | 6/2000 | Futatsugi et al. ............... | 703/23 |
| 6,542,172 | B1 * | 4/2003 | Yamamoto .................... | 715/837 |
| 7,712,045 | B2 * | 5/2010 | LeMay et al. ................. | 715/788 |
| 7,818,684 | B1 * | 10/2010 | Smith ............................ | 715/794 |
| D658,200 | S * | 4/2012 | Gleasman et al. ........... | D14/486 |
| 8,201,101 | B2 * | 6/2012 | Wiley ............................ | 715/800 |
| D664,974 | S * | 8/2012 | Gleasman et al. ........... | D14/486 |
| 8,418,070 | B2 * | 4/2013 | Mayer-Ullmann ........... | 715/763 |
| 2007/0130529 | A1 * | 6/2007 | Shrubsole ..................... | 715/762 |
| 2007/0180391 | A1 * | 8/2007 | Zimmer et al. ............... | 715/764 |
| 2008/0040661 | A1 * | 2/2008 | Curtis et al. .................. | 715/243 |
| 2008/0126944 | A1 * | 5/2008 | Curtis et al. .................. | 715/733 |
| 2009/0070667 | A1 * | 3/2009 | Zlatanov et al. ............. | 715/243 |
| 2009/0144652 | A1 * | 6/2009 | Wiley ............................ | 715/800 |
| 2009/0183109 | A1 * | 7/2009 | Dan .............................. | 715/788 |
| 2009/0210820 | A1 * | 8/2009 | Adachi et al. ................. | 715/786 |

(Continued)

FOREIGN PATENT DOCUMENTS

| | | |
|---|---|---|
| CN | 1648847 A | 8/2005 |
| CN | 1790338 A | 6/2006 |

(Continued)

OTHER PUBLICATIONS

Landay, J. et al., "Sketching interfaces: Toward more human interface design," Computer, IEEE Computer Society Press, Mar. 2001, vol. 34, No. 3, pp. 56-64.

*Primary Examiner* — William Bashore
*Assistant Examiner* — Reza Nabi
(74) *Attorney, Agent, or Firm* — Cuenot, Forsythe & Kim, LLC

(57) ABSTRACT

A layout converter for converting a layout of a display screen on which display areas for a plurality of software components are arranged can include a detection unit for detecting a plurality of target display areas having a predetermined arrangement relationship from the plurality of display areas. The layout converter further can include a generation unit for generating a container, in which display contents of the plurality of target display areas are unified and displayed within one unified display area, and adding the container to the layout of the display screen.

20 Claims, 27 Drawing Sheets

(56) References Cited

U.S. PATENT DOCUMENTS

| | | | |
|---|---|---|---|
| 2010/0088618 A1* | 4/2010 | Mayer-Ullmann | 715/763 |
| 2010/0107056 A1* | 4/2010 | Underhill et al. | 715/235 |
| 2010/0153872 A1* | 6/2010 | Ahn et al. | 715/768 |
| 2010/0235411 A1* | 9/2010 | Bray | 707/812 |
| 2010/0251143 A1* | 9/2010 | Thomas et al. | 715/760 |
| 2012/0210208 A1* | 8/2012 | Underhill et al. | 715/234 |

FOREIGN PATENT DOCUMENTS

| | | |
|---|---|---|
| JP | 09-212350 | 8/1997 |
| JP | 9212350 | 8/1997 |
| JP | 9237181 | 9/1997 |
| JP | 9258975 | 10/1997 |
| JP | 2007511814 A | 5/2007 |
| JP | 2009169462 A | 7/2009 |
| WO | 2007132648 A1 | 11/2007 |

\* cited by examiner

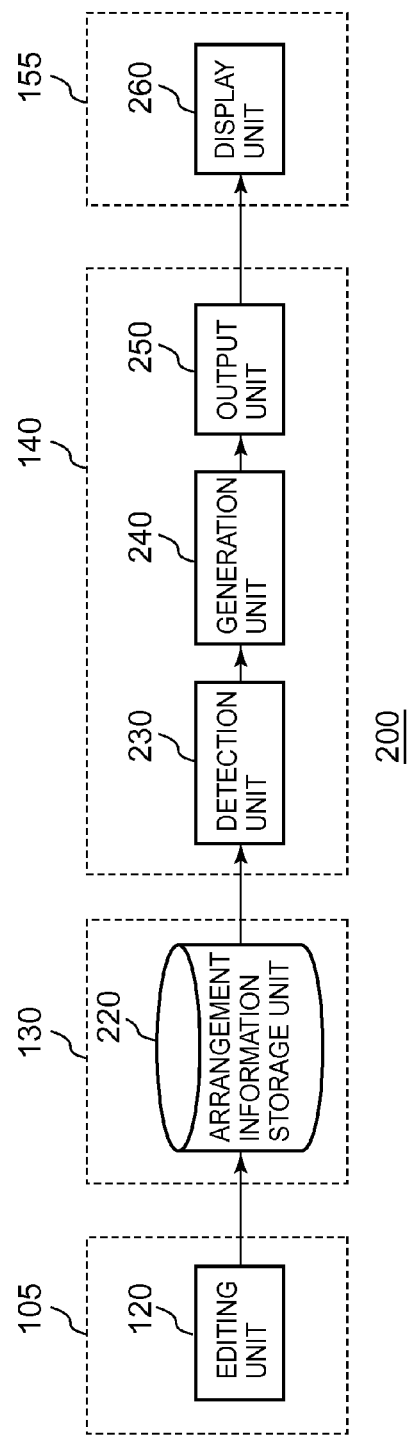
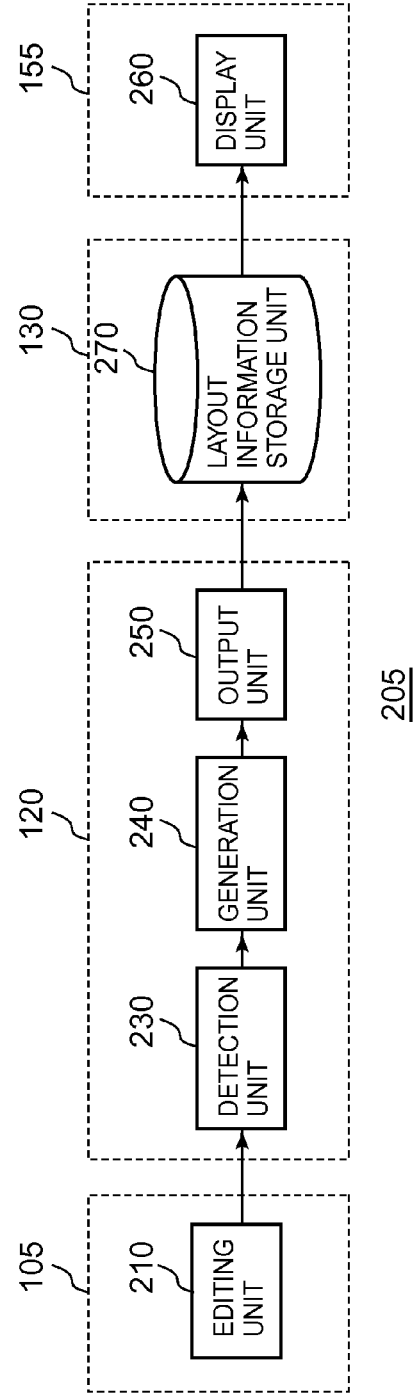
FIG. 2A
FIG. 2B

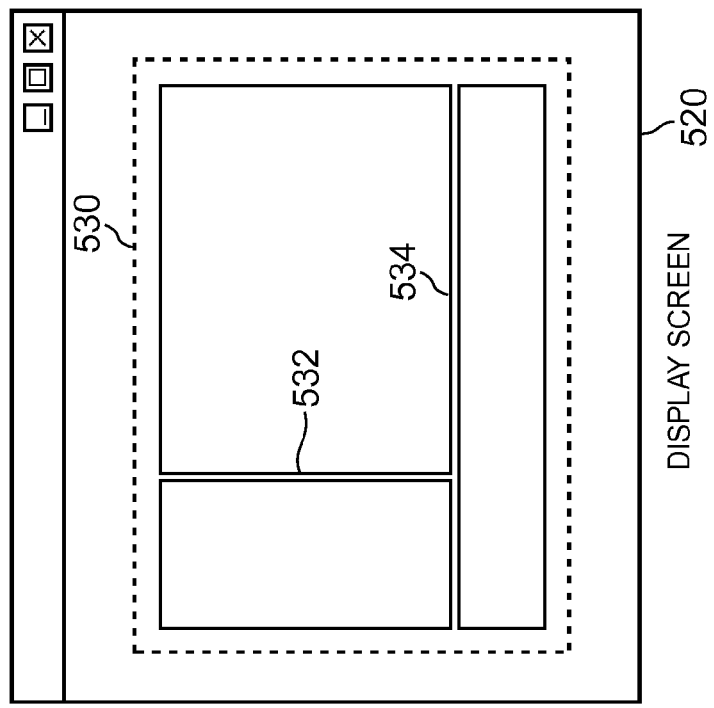
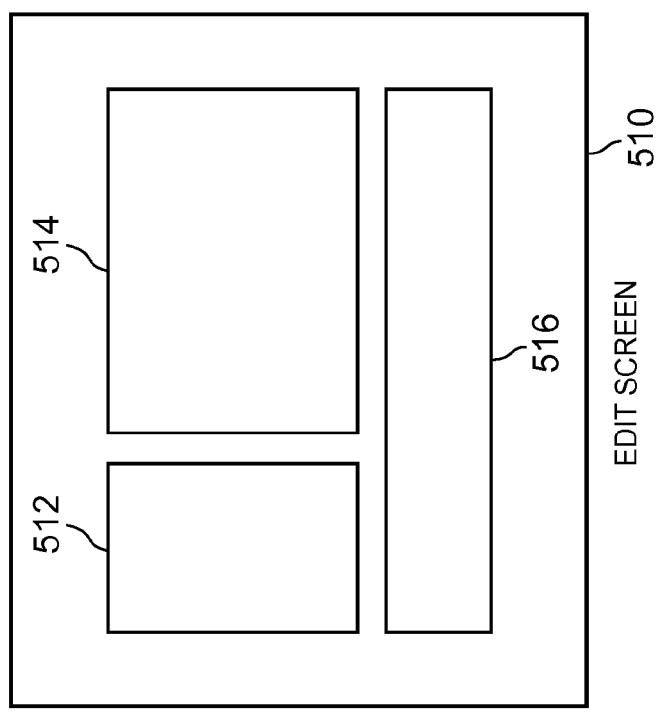
FIG. 5A

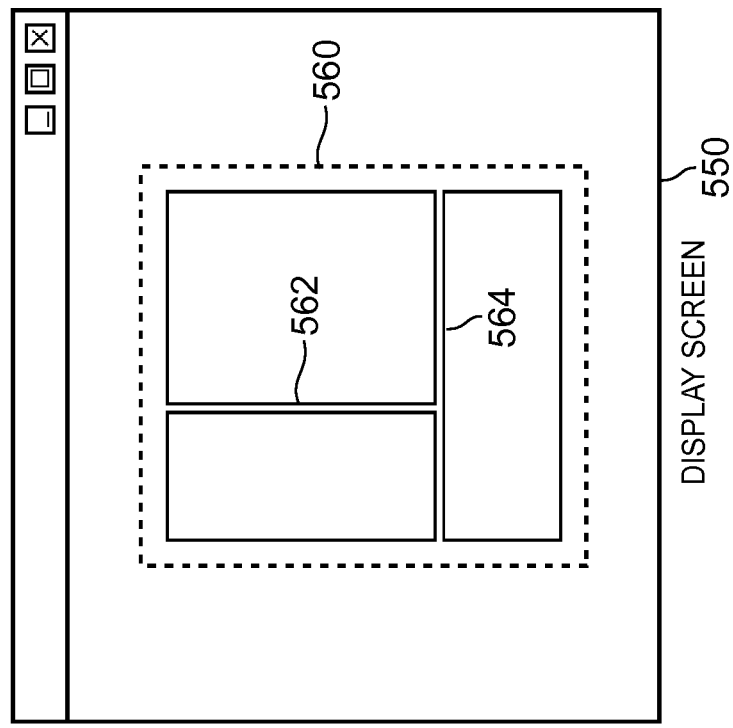
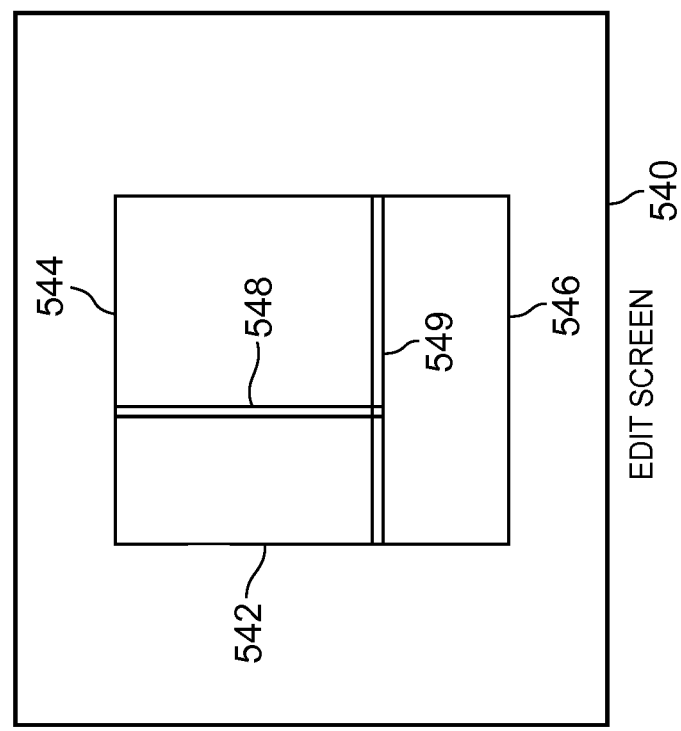
FIG. 5B

LAYOUT CONVERTER, LAYOUT CONVERSION PROGRAM, AND LAYOUT CONVERSION METHOD

CROSS-REFERENCE TO RELATED APPLICATIONS

This application claims the benefit of Japanese Application Serial Number JP-2010-56530 filed on Mar. 12, 2010, which is fully incorporated herein by reference.

BACKGROUND

One or more embodiments disclosed within this specification relate to a layout converter, a layout conversion program, and a layout conversion method.

There has been provided an application development environment for developing applications by combining control parts or other components (software components) by drag and drop without directly performing programming.

BRIEF SUMMARY

Since there are a wide variety of layout types of user interface (UI) components for applications, a developer of an application development tool is hard-pressed to develop a design function specialized in the layout types. Moreover, the application developer is required to have skill in mastering design function. On the other hand, unless the design function is implemented in the development tool, the labor of coding codes for using the layout imposes a heavier burden on the application developer.

In order to solve the above problem, according to a first aspect of the present invention, there is provided a layout converter for converting a layout of a display screen on which display areas for a plurality of software components are arranged, the layout converter can include a detection unit for detecting a plurality of target display areas having a predetermined arrangement relationship from the plurality of display areas and a generation unit for generating a container, in which display contents of the plurality of target display areas are unified and displayed within one unified display area, and adding the container to the layout of the display screen.

It should be noted that the above summary of the invention does not cite all the necessary features of the embodiments of the present invention, and that the subcombination of the groups of these features can constitute one or more embodiments of the invention.

BRIEF DESCRIPTION OF THE SEVERAL VIEWS OF THE DRAWINGS

FIG. 2A is a diagram illustrating a layout conversion system 200 corresponding to another embodiment, together with an editing device 105, a storage device 130, a conversion device 140, and a display device 155;

FIG. 2B is a diagram illustrating a layout conversion system 205 corresponding to another embodiment, together with an editing device 105, a conversion device 120, a storage device 130, and a display device 155;

FIG. 5A is a diagram illustrating an example of an arrangement condition corresponding to a non-resizable split container according to another embodiment;

FIG. 5B is a diagram illustrating an example of an arrangement condition corresponding to a resizable split container according to another embodiment;

DETAILED DESCRIPTION

Hereinafter, aspects of the present invention will be described through illustration of one or more embodiments of the invention. The embodiments described below, however, do not limit the embodiments of the invention. The scope of the various embodiments disclosed is to be construed according to the claims. In this regard, one or more or all combinations of the features described in the embodiments are not necessarily essential to means for solving the problems addressed within this specification.

Figure 1:
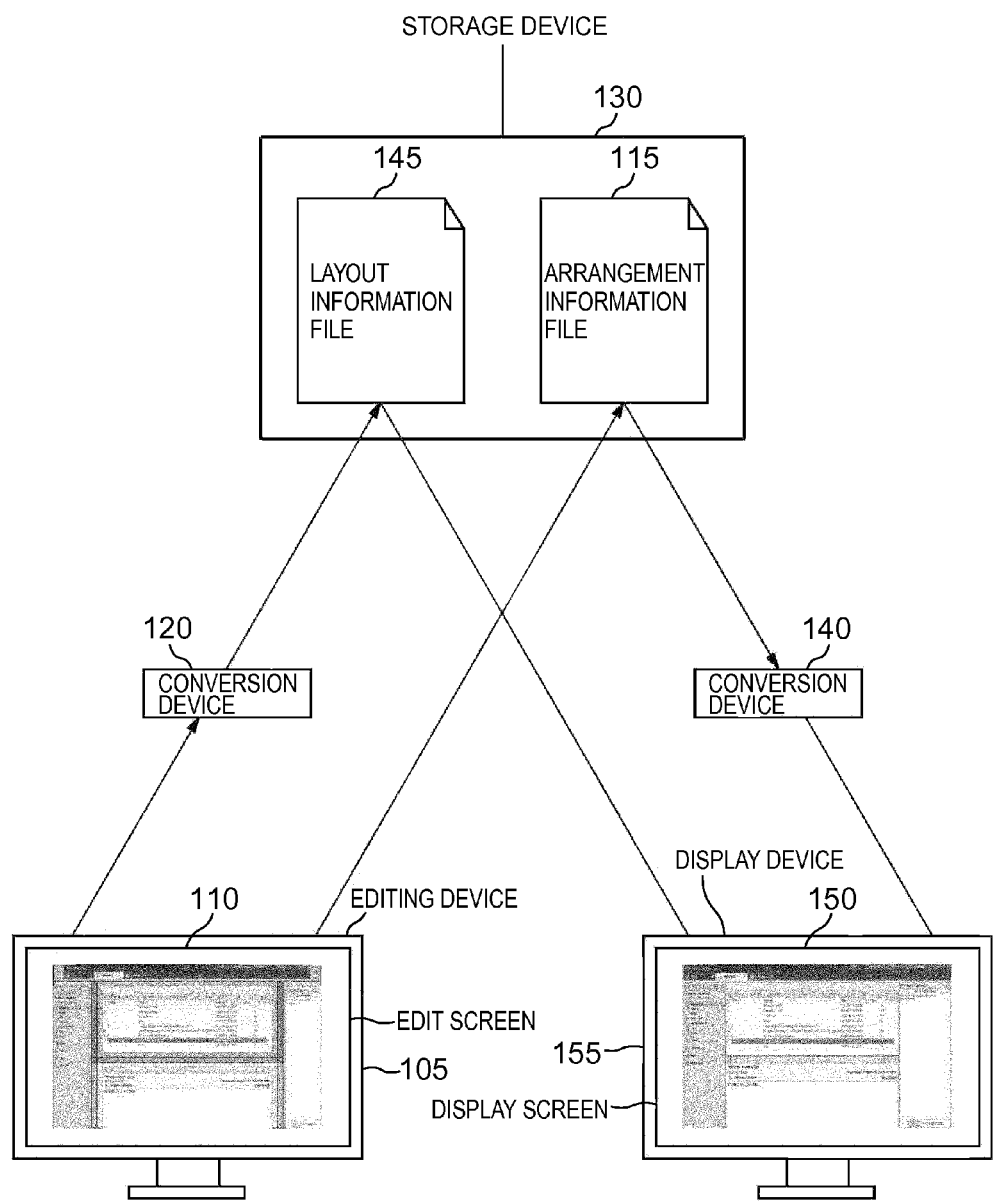
FIG. 1 is a diagram illustrating an example of a system 100 according to an embodiment.

FIG. 1 shows an example of a system 100 according to an embodiment. The system 100 includes an editing device 105, a conversion device 120 and/or 140, a storage device 130, and a display device 155. The system 100 is able to create an application layout including a container for unifying and displaying display areas for a plurality of software components on the basis of the arrangement of the display areas made by an application developer without direct editing or coding by the application developer. In this regard, the term "container" can mean a software component for providing a screen on which, for example, the display contents of a plurality of software components are unified and displayed so that an application user can reference the display contents through a common UI. The container may have one or more software components as children or may have information on how the display contents of one or more components are to be displayed, namely information on the types of UI or the like.

In an embodiment, the system 100 includes the editing device 105, the storage device 130, the conversion device 140, and the display device 155. The editing device 105 may be a computer, a terminal, or the like used by the application developer to arrange the display areas for the components constituting an application. The editing device 105 includes an edit screen 110 in which the application developer is able to arrange the display areas for the components, for example, in an absolute coordinate system by using a GUI.

In response to a fact that the application developer arranges the display areas for the plurality of components on the edit screen 110 so as to satisfy the arrangement condition corresponding to the container, the editing device 105 outputs arrangement information on the display areas for the plurality of components to the storage device 130. The arrangement information may be the position, size, or the like of the display areas for the components arranged on the edit screen 110 by the application developer.

The storage device 130 stores the arrangement information by inputting the arrangement information output from the editing device 105. The storage device 130 may store an arrangement information file 115 by generating the arrangement information file 115 corresponding to the arrangement information. The arrangement information file 115 stores arrangement information on the display areas for the plurality of components. The storage device 130 may be the same computer as the editing device 105 or another computer on a network. Subsequently, the storage device 130 outputs the arrangement information to the conversion device 140.

The conversion device 140 inputs the arrangement information from the storage device 130, converts the arrangement information to the corresponding layout information, and outputs the layout information to the display device 155. The layout information may be information describing the layout of the display screen including at least one component and/or a container.

The display device 155 inputs the layout information from the conversion device 140 and displays a display screen 150 according to the layout of the display screen including the display areas for at least one component and/or the container described in the layout information. The display device 155 may be a computer, a terminal, or the like used by the application user to display the display areas for the components constituting an application on the display screen 150.

In another embodiment, the system 100 can include the editing device 105, the conversion device 120, the storage device 130, and the display device 155. The editing device 105 can be a computer, a terminal, or the like used by the application developer to arrange the display areas for the components constituting an application. The editing device 105 can include an edit screen 110 in which the application developer is able to arrange the display areas for the components, for example, in an absolute coordinate system by using a GUI.

In response to a fact that the application developer arranges the display areas for the plurality of components on the edit screen 110 so as to satisfy the arrangement condition corresponding to the container, the editing device 105 outputs arrangement information on the plurality of components to the conversion device 120. The conversion device 120 inputs the arrangement information from the editing device 105, converts the arrangement information to corresponding layout information, and outputs the layout information to the storage device 130.

The storage device 130 stores layout information by inputting the layout information output from the conversion device 120. The storage device 130 may store a layout information file 145 by generating the layout information file 145 corresponding to the layout information. The layout information file 145 includes information on the layout of a display screen including the display areas for at least one component and/or a container. Subsequently, the storage device 130 outputs the layout information to the display device 155.

The display device 155 inputs the layout information from the storage device 130 and displays the display screen 150 according to the layout of the display screen including the display areas for at least one component and/or the container described in the layout information. The display device 155 may be a computer, a terminal, or the like used by the application user to display the display areas for the components constituting an application on the display screen 150.

FIG. 2A shows a layout conversion system 200 corresponding to another embodiment, together with the editing device 105, the storage device 130, the conversion device 140, and the display device 155. The layout conversion system 200 may be an editing device for editing the layout of the display screen for an application in which a plurality of software components are linked with each other. The layout conversion system 200 converts arrangement information including the arrangement of the display areas for the plurality of software components to layout information corresponding to the arrangement information and outputs the layout information to the display device 155, for example, in response to a request of the layout information on the display screen from the display device 155 to the storage device 130.

The editing device 105 has an editing unit 210. The editing unit 210 arranges a plurality of display areas within the edit screen according to the application developer's instructions, generates arrangement information on the plurality of display areas, and outputs the arrangement information to the storage device 130.

The storage device 130 has an arrangement information storage unit 220. The arrangement information storage unit 220 inputs the arrangement information on the display areas for the plurality of components from the editing unit 210 and stores the arrangement information, for example, as an arrangement information file 115. The arrangement information storage unit 220 outputs the arrangement information to the conversion device 140.

The conversion device 140 has a detection unit 230, a generation unit 240, and an output unit 250. The detection unit 230 inputs the arrangement information from the arrangement information storage unit 220 and detects a plurality of target display areas having a predetermined arrangement relationship from the plurality of display areas included in the arrangement information. Hereinafter, the plurality of display areas having the predetermined arrangement relationship detected by the detection unit 230 will be referred to as "plurality of target display areas." For example, with reference to the X and Y coordinates of the display areas of the components, the detection unit 230 detects, as a positional relationship between the display areas for the plurality of components, at least one of the following, for example: the display areas for the plurality of components have an overlapping relationship; the display areas for the plurality of components are adjacent to each other; the display areas for the plurality of components are arranged so as to border the top/bottom/left/right edge of the edit screen; the top/bottom/left/right sides of the display areas for the plurality of components form a rectangular area; the top and/or bottom sides of the display areas for the plurality of components are aligned; and the right/left sides of the display areas are aligned.

The generation unit 240 generates a container, in which the display contents of the plurality of target display areas are unified and displayed within one unified display area, and then adds the container to the layout of the display screen, according to the arrangement relationship detected by the detection unit 230. For example, the generation unit 240 generates a container including one or more components as children by using a tree structure. The generation unit 240 may generate at least one of a split container, a portal container, an accordion container, a tab panel, a pager, a section container, and a side bar, which will be described later.

The output unit 250 outputs information for displaying the layout of the display screen including the container generated by the generation unit 240 to the display device 155. The output unit 250 may output an application, e.g., program, code as the layout information file 145.

The display device 155 has a display unit 260. The display unit 260 executes the application code on the basis of the information input from the output unit 250 and displays the display screen 150 according to the layout including the container generated by the generation unit 240.

FIG. 2B shows a layout conversion system 205 corresponding to another embodiment, together with an editing device 105, a conversion device 120, a storage device 130, and a display device 155. For example, in response to a fact that the display areas are arranged, the layout conversion system 205 converts arrangement information including the arrangement of the display areas for the plurality of software components to layout information corresponding to the arrangement information and outputs the layout information to the storage device 130.

The editing device 105 has an editing unit 210. The editing unit 210 arranges a plurality of display areas in the edit screen according to the application developer's instructions, generates arrangement information on the plurality of display areas, and outputs the arrangement information to the conversion device 120.

The conversion device 120 has a detection unit 230, a generation unit 240, and an output unit 250. The detection unit 230 inputs the arrangement information from the editing unit 210 and detects a plurality of target display areas having a predetermined arrangement relationship from the plurality of display areas included in the arrangement information. The generation unit 240 generates a container, in which the display contents of the plurality of target display areas are unified and displayed within one unified display area, and then adds the container to the layout of the display screen, according to the arrangement relationship detected by the detection unit 230. The output unit 250 outputs information for displaying the layout of the display screen including the container generated by the generation unit 240 to the storage device 130.

The storage device 130 has a layout information storage unit 270. The layout information storage unit 270 inputs the information for displaying the layout of the display screen including the container generated by the generation unit 240 from the output unit 250 and stores the information as, for example, the layout information file 145. The layout information storage unit 270 outputs the layout information to the display device 155.

The display device 155 has a display unit 260. The display unit 260 executes the application on the basis of the information input from the layout information storage unit 270 and displays the display screen 150 according to the layout including the container generated by the generation unit 240.

FIGS. 3A, 3B, 3C, 3D, and 3E show examples of the container according to another embodiment. The generation unit 240 may select a container, in which the display contents of the plurality of target display areas are displayed, from a plurality of types of containers according to the arrangement relationship of the plurality of target display areas. For example, there are layout containers and stack containers as containers. The layout container is a container in which one display screen is split into a plurality of display parts and the display contents of a plurality of components are displayed on the display parts at a time, like a split container 311 shown in FIG. 3A and a portal container 321 shown in FIG. 3B. The stack container is a container in which the display contents of the plurality of components are, for example, placed in the same position (stacked) and the tab sections corresponding to the respective components and the display content of one specified component are displayed on the front of the screen with the display contents of other components hidden, like an accordion container 331 shown in FIG. 3C, a tab panel 341 shown in FIG. 3D, and a pager 351 shown in FIG. 3E.

Figure 3A:
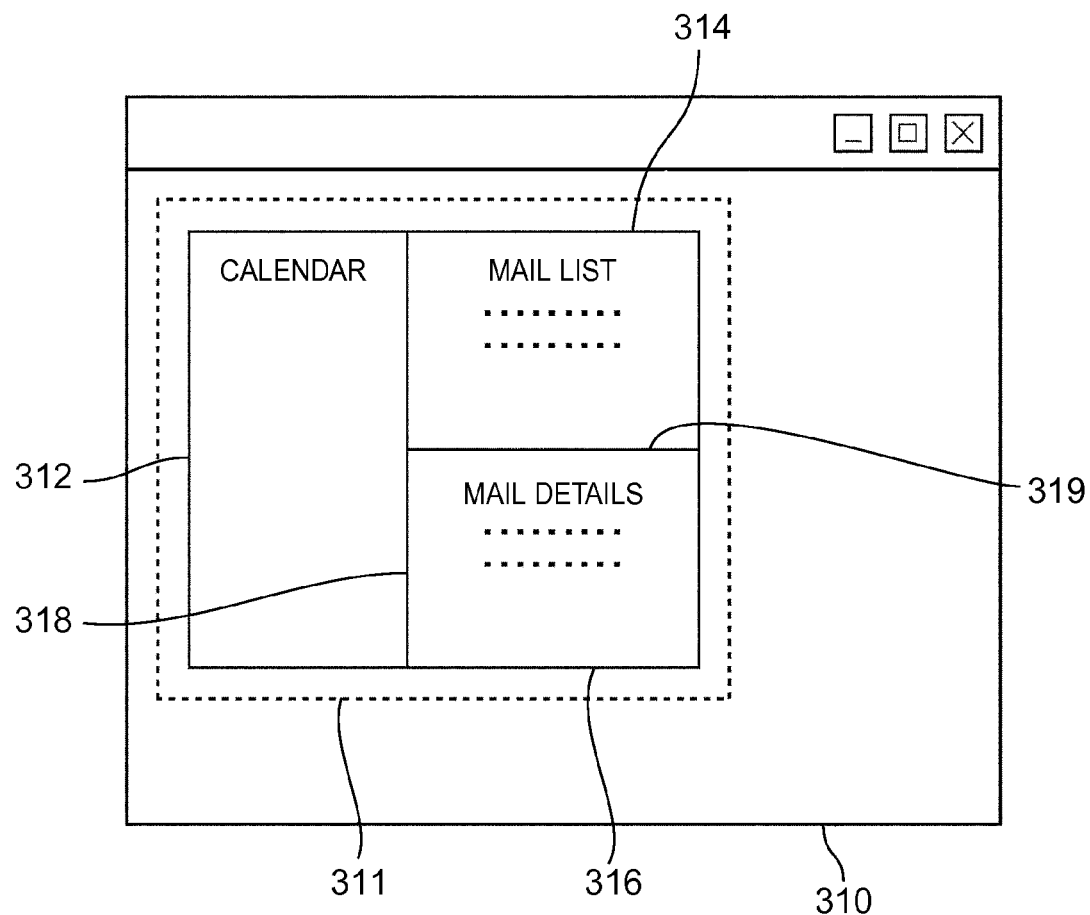
FIG. 3A is a diagram illustrating a display screen 310 for displaying a split container 311, which is an example of a layout container according to another embodiment.

FIG. 3A shows a display screen 310 for displaying a split container 311, which is an example of a layout container according to another embodiment. The unified display area which is a display area of the split container 311 includes, for example, component display parts 312, 314, and 316 so as to correspond to a plurality of components, respectively, and splitters 318 and 319. The component display parts 312, 314, and 316 are used for the display unit 260 to display the display contents of the corresponding components. The splitters 318 and 319 are parts where the display unit 260 explicitly displays boundaries of the display parts 312, 314, and 316 for one or more components, respectively.

The splitter 318 which splits the display area horizontally may be movable in the horizontal direction in the split container 311. The splitter 319 which splits the display area vertically may be movable in the vertical direction in the split container 311. If the splitters 318 and 319 are movable, the application user, who uses the display device 155 having the display unit 260, is able to change a vertical or horizontal split ratio of the component display parts 312, 314, and 316 in one unified display area by moving the splitter 318 or 319 through a GUI.

Figure 3B:
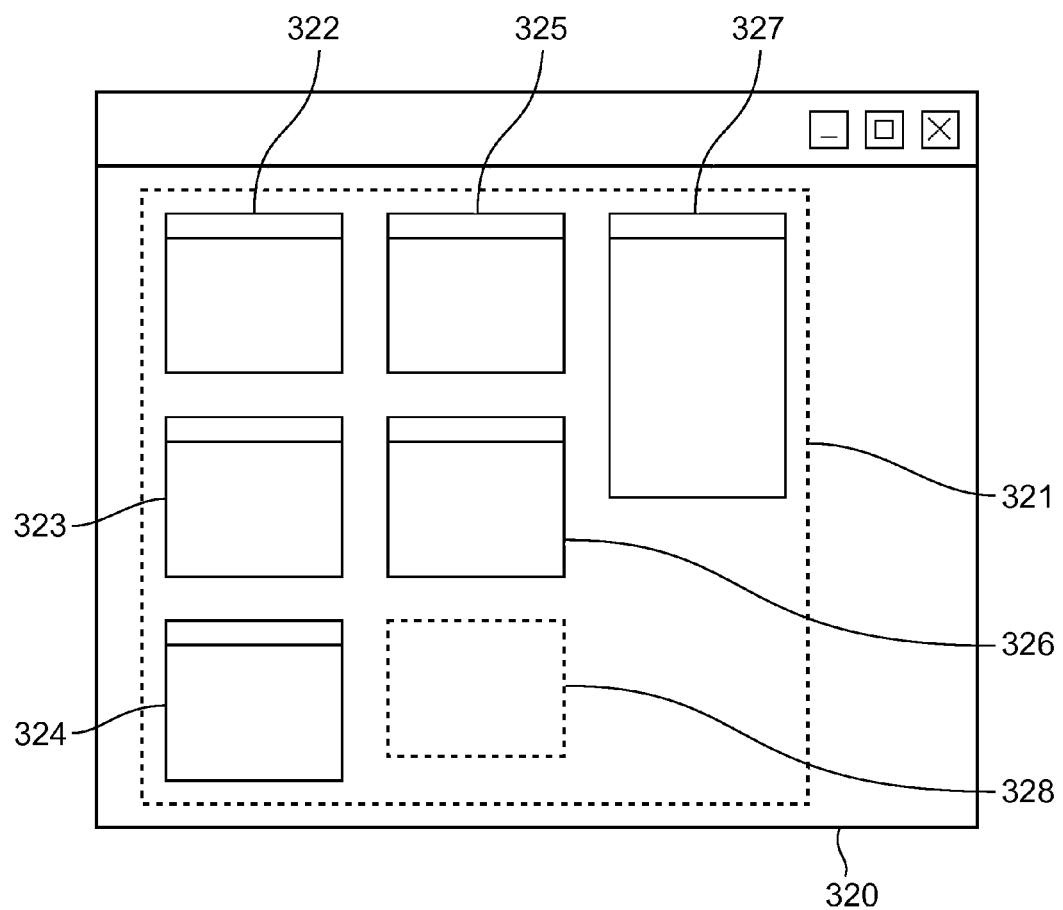
FIG. 3B is a diagram illustrating a display screen 320 for displaying a portal container 321, which is an example of a layout container according to another embodiment.

FIG. 3B shows a display screen 320 for displaying a portal container 321, which is an example of a layout container according to another embodiment. The unified display area which is a display area of the portal container 321 includes, for example, component display areas 322, 323, 324, 325, 326, and 327 so as to correspond to a plurality of components, respectively. The component display areas 322, 323, 324, 325, 326, and 327 are display parts for displaying the display contents of the corresponding components, respectively. The display unit 260 displays the display contents of the components in a plurality of columns within one unified display area.

The application user is able to move the display areas for the components between the columns and/or within the same column by dragging and dropping the display area for one component onto a new display area in the portal container 321. For example, the application user is able to move the component corresponding to the display area 322 to a new display area 328 by dragging and dropping the component display area 322 onto the new display area 328.

Figure 3C:
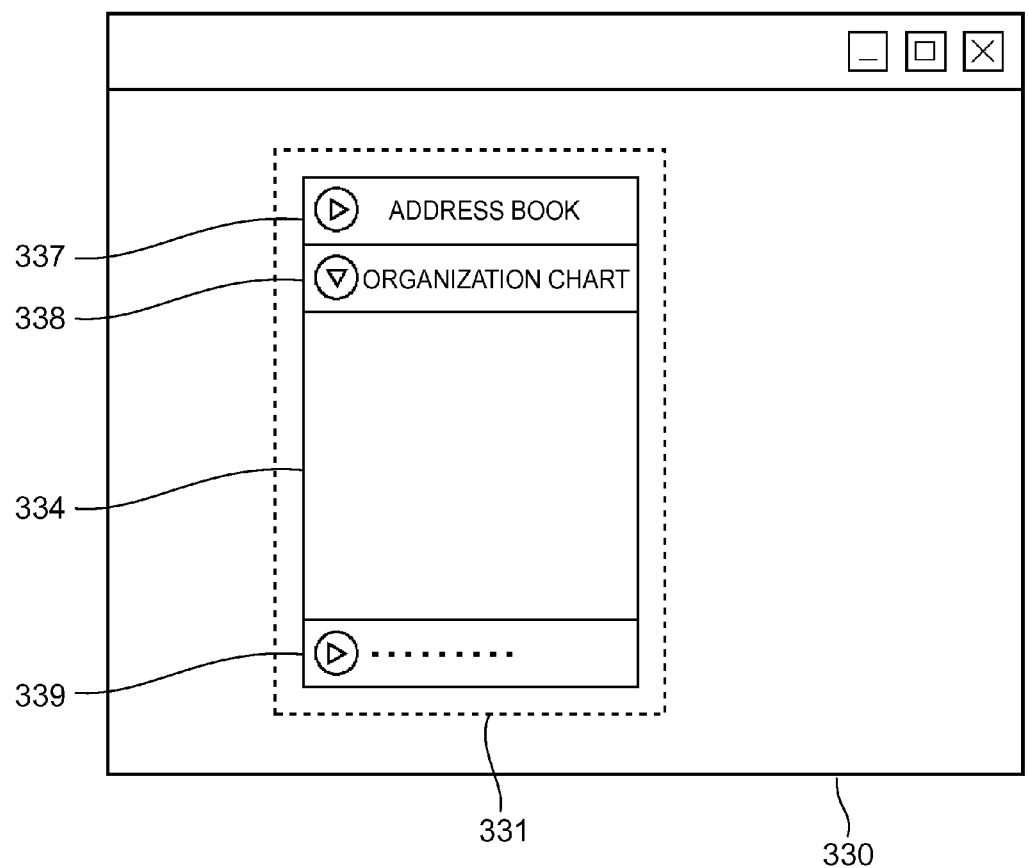
FIG. 3C is a diagram illustrating a display screen 330 for displaying an accordion container 331, which is an example of a stack container according to another embodiment.

FIG. 3C shows a display screen 330 for displaying an accordion container 331, which is an example of a stack container according to another embodiment. The accordion container 331 includes, for example, component display contents 332 (not shown), 334, and 336 (not shown) and tab sections 337, 338, and 339 so as to correspond to a plurality of components. The component display contents 332, 334, and 336 are display parts for displaying the display contents of the corresponding components, respectively. The display unit 260 displays the display content 334 of the component corresponding to the tab section 338 so as to be visible by stacking the display contents 332, 334, and 336 of the components in the same position.

The tab sections 337, 338, and 339 are parts for representing information for identifying the display contents of the corresponding components and for causing the application user to select one component. The display unit 260 displays the display content 334 of one specified component in the accordion container 331 with the display contents 332 and 336 of other components hidden. In this regard, if the application user clicks on the tab section 337 for specification, the accordion container 331 displays the display content 332 of the component corresponding to the tab section 337 on the front of the screen, with the display contents 334 and 336 of other components hidden.

Figure 3D:
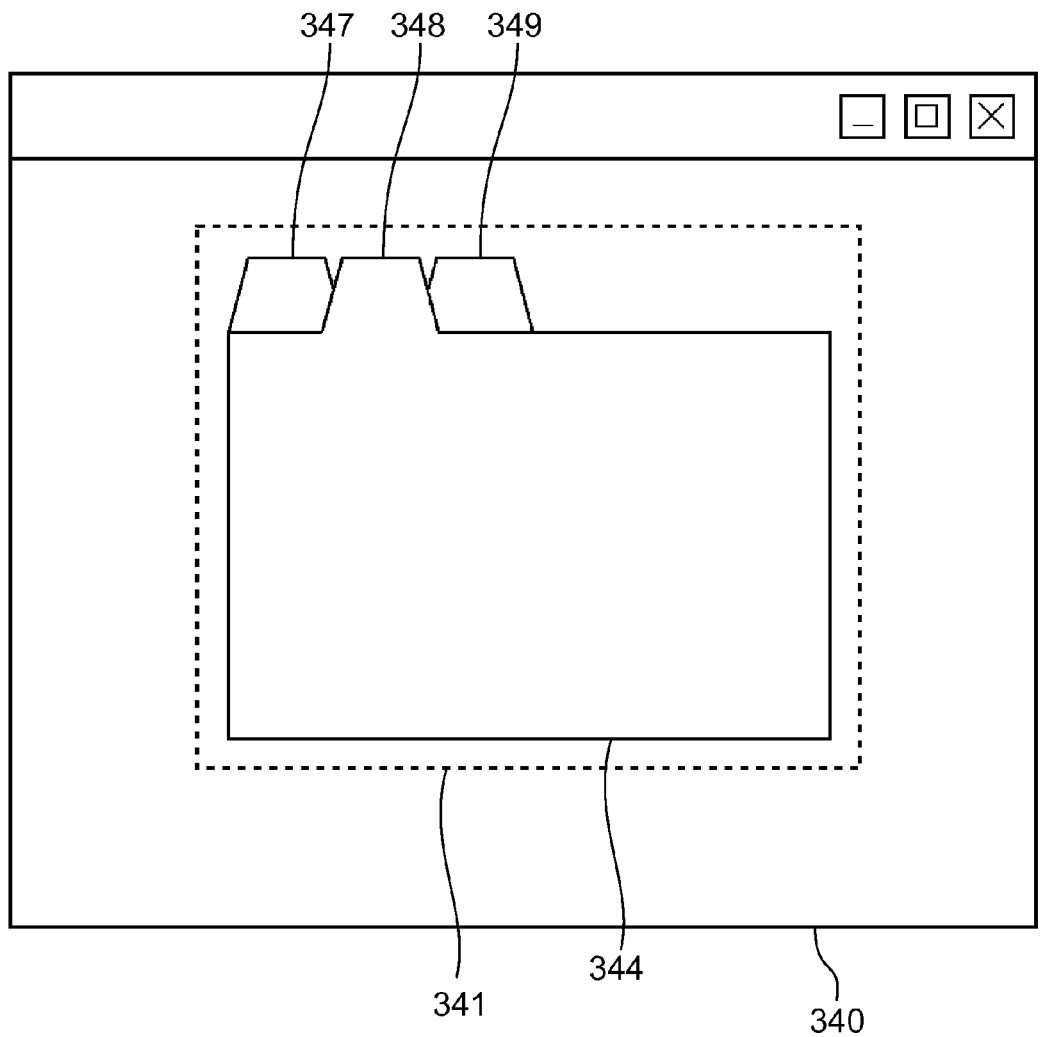
FIG. 3D is a diagram illustrating a display screen 340 for displaying a tab panel 341, which is an example of a stack container according to another embodiment.

FIG. 3D shows a display screen 340 for displaying a tab panel 341, which is an example of a stack container according to another embodiment. The tab panel 341 includes, for example, component display contents 342 (not shown), 344, and 346 (not shown) and tab sections 347, 348, and 349 so as to correspond to a plurality of components. The component display contents 342, 344, and 346 are display parts for displaying the display contents of the corresponding components, respectively. The display unit 260 displays the display content 344 of the component corresponding to the tab section 348 so as to be visible by stacking the display contents 342, 344, and 346 of the plurality of components in the same position.

The tab sections 347, 348, and 349 are parts for representing information for identifying the display contents of the corresponding components and for causing the application user to select one component. The display unit 260 displays the display content 344 of one specified component in the tab panel 341 with the display contents 342 and 346 of other components hidden. In this regard, if the application user clicks on the tab section 349 for specification, the tab panel 341 displays the display content 346 of the component corresponding to the tab section 349 on the front of the screen with the display contents 342 and 344 of other components hidden.

Figure 3E:
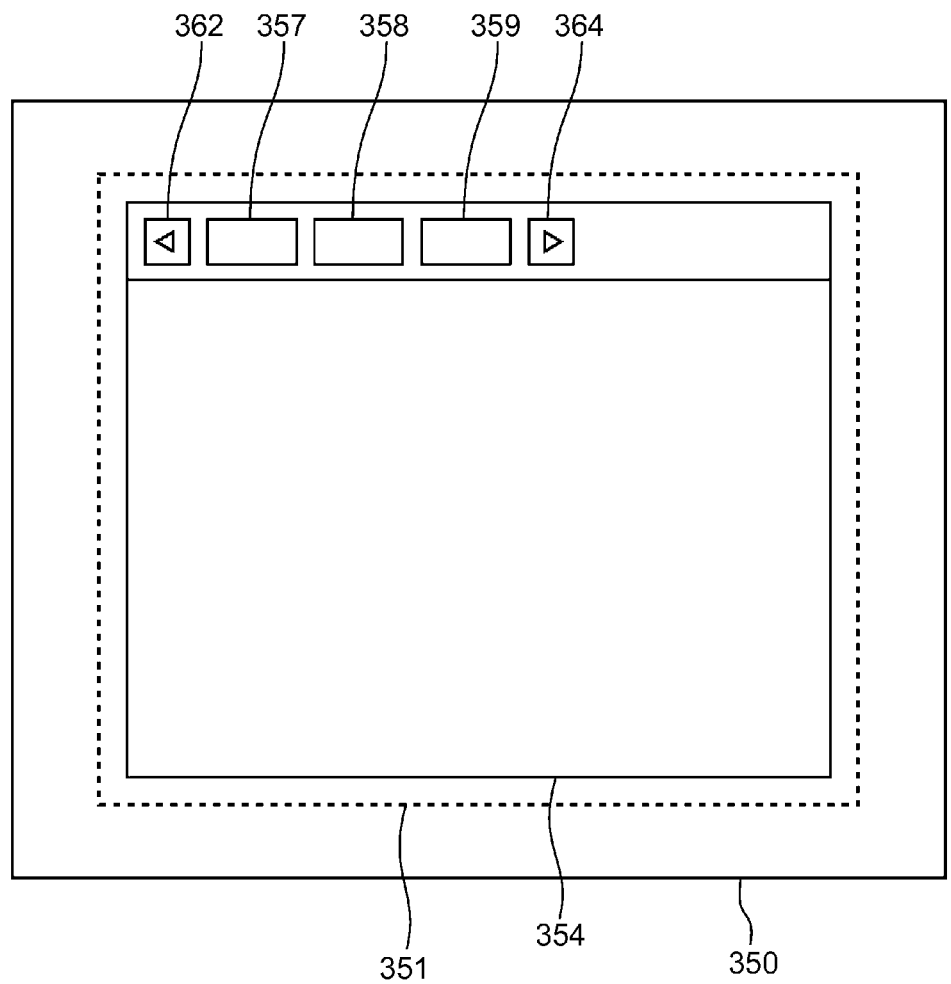
FIG. 3E is a diagram illustrating a display screen 350 for displaying a pager 351, which is an example of a stack container according to another embodiment.

FIG. 3E shows a display screen 350 for displaying a pager 351, which is an example of a stack container according to another embodiment. The pager 351 includes, for example, display contents 352 (not shown), 354, and 356 (not shown) of a plurality of components and page specification sections 357, 358, and 359, and a left button 362 and a right button 364. The display contents 352, 354, and 356 of the components are parts for displaying the display contents of the corresponding components, respectively. The display unit 260 displays the display content 352 of the component corresponding to the page specification section 358 so as to be visible by stacking the display contents 352, 354, and 356 of the components in the same position.

The page specification sections 357, 358, and 359 are parts for representing information for identifying the display contents of the corresponding components and for causing the application user to select one component. The display unit 260 displays the display content 352 of one specified component in the pager 351 with the display contents 354 and 356 of other components hidden. In this regard, if the application user clicks on the page specification section 359 for specification, the pager 351 displays the display content 356 of the component corresponding to the page specification section 359 on the front of the screen with the display contents 352 and 354 of other components hidden. In addition, if the application user clicks on the left button 362 or the right button 364 for specification, the pager 351 displays the display content corresponding to the component preceding/following the component corresponding to the display content currently displayed on the front of the screen, with the display contents of other components hidden.

The detection unit 230 may store conditions for an arrangement relationship between two or more display areas, under which each container is to be selected, so as to correspond to each of the plurality of types of containers as described above and then identify a condition which matches the arrangement relationship between the plurality of target display areas. For example, the detection unit 230 stores conditions for an arrangement relationship between display areas for components, under which the proper container is to be selected, so as to correspond to each of the containers shown in FIGS. 3A, 3B, 3C, 3D, and 3E, and identifies a condition which matches the arrangement relationship between the display areas for the plurality of components. Subsequently, the generation unit 240 may select a container of a type associated with the identified condition.

Figure 4:
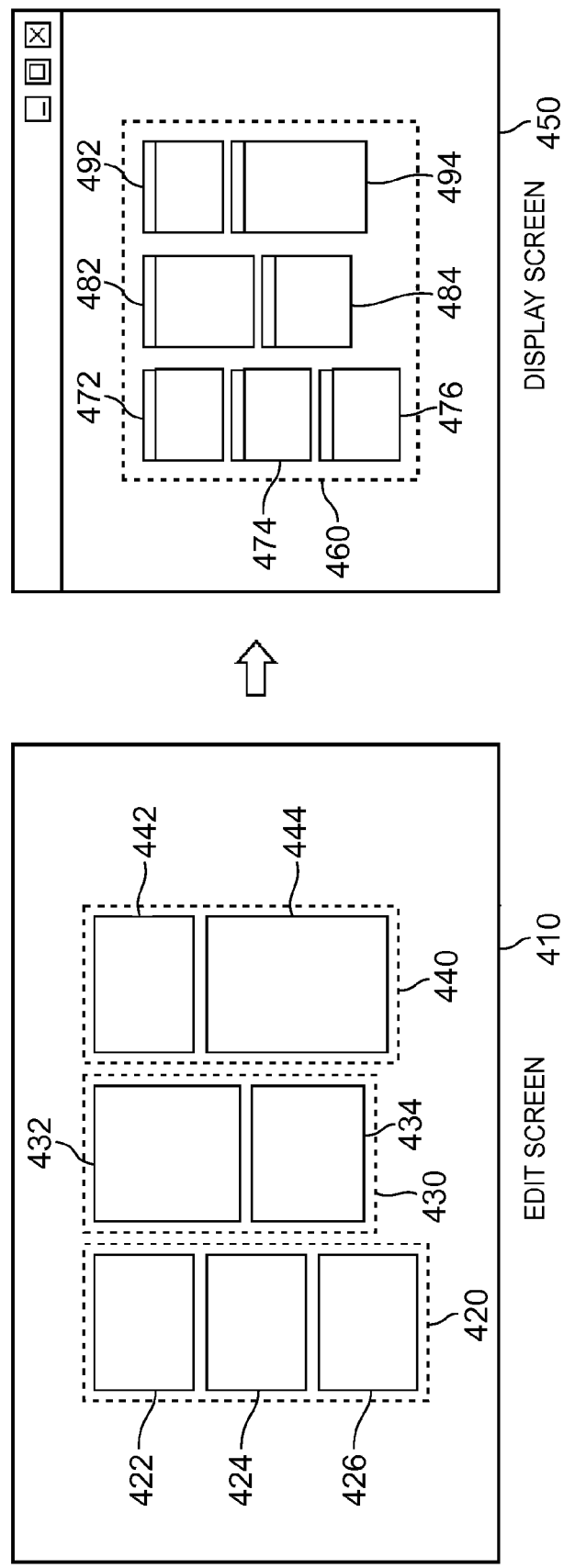
FIG. 4 is a diagram illustrating an example of an arrangement condition corresponding to a portal container according to another embodiment.

FIG. 4 shows an example of an arrangement condition corresponding to a portal container according to another embodiment. The detection unit 230 may detect a plurality of target display areas having a predetermined positional relationship from the plurality of display areas.

If the detection unit 230 detects the plurality of target display areas, in which the display areas are arranged vertically with the left and right sides to be boundaries of the display areas aligned and constitute a plurality of columns and the top edges of the plurality of columns are aligned horizontally, the generation unit 240 may add the display contents of the components corresponding to the detected plurality of target display areas to the layout of the display screen by generating a portal container. For example, in an edit screen 410, the detection unit 230 detects the following: each of the left side and the right side of the display areas 422, 424, and 426 for a plurality of components is aligned and the display areas 422, 424, and 426 constitute a column 420; each of the left side and the right side of the display areas 432 and 434 for a plurality of components is aligned and the display areas 432 and 434 constitute a column 430; each of the left side and the right side of the display areas 442 and 444 for a plurality of components is aligned and the display areas 442 and 444 constitute a column 440; the top edge of the columns 420, 430, and 440 is aligned; and the bottom edge of the columns 420, 430, and 440 is not aligned. In response to the detection, the generation unit 240 may generate a portal container 460, in which the component display areas 472, 474, 476, 482, 484, 492, and 494 for displaying the display contents of the respectively corresponding components are displayed with being arranged in a plurality of columns, and then add the portal container 460 to the layout of a display screen 450.

FIG. 5A shows an example of an arrangement condition corresponding to a non-resizable split container according to another embodiment. The detection unit 230 may detect a plurality of target display areas, which are arranged with at least a part of sides to be boundaries of display areas aligned, from a plurality of display areas. If the display areas for two or more components fill a rectangular area and sides to be boundaries are arranged so as to substantially border the sides of the adjacent display areas, respectively, the detection unit 230 may detect the two or more display areas as a plurality of target display areas having a predetermined positional relationship. In this case, the generation unit 240 may generate a split container, in which the display contents of the respective software components corresponding to the plurality of target display areas are displayed with being split into the display parts corresponding to the plurality of target display areas, respectively, within the unified display area depending on the rectangular area and then add the split container to the layout of the display screen.

The generation unit 240 may set the boundary position of the display part to be unchangeable with respect to the boundary lines corresponding to the sides each arranged so as to border the side of an adjacent target display area among the sides of the plurality of target display areas in the split container. For example, if the detection unit 230 detects that the component display areas 512, 514, and 516 are adjacent to each other in an edit screen 510, the generation unit 240 may generate a split container 530 having unmovable splitters 532 and 534 and may add the split container 530 to the layout of the display screen 520. In this regard, the detection unit 230 may store the range of the width of a gap between sides which are previously determined to be adjacent to each other and calculate the width of the gap between the sides from the absolute coordinates of the component display areas adjacent to each other. If determining that the calculated gap width is included in the range, the detection unit 230 may detect that a splitter having an unmovable boundary position is to be generated by considering that the sides of the component display areas adjacent to each other border each other.

FIG. 5B shows an example of an arrangement condition corresponding to a resizable split container according to another embodiment. The generation unit 240 may set the boundary position of the display part to be changeable with respect to the boundary lines corresponding to the sides each arranged so as to overlap the side of an adjacent target display area among the sides of the plurality of target display areas in the split container. The detection unit 230 detects that the display areas 542, 544, and 546 for the plurality of components are adjacent to each other with overlapping portions 546 and 549 in the sides in an edit screen 540. In response to this, the generation unit 240 may generate a corresponding split container 560 having movable splitters 562 and 564 and add the split container 560 to the layout of a display screen 550. In this regard, the detection unit 230 may store the range of the width of an overlapping portion between the sides and calculate the width of the overlapping portion between the sides from the absolute coordinates of the component display areas adjacent to each other. If determining that the calculated width of the overlap portion is included in the range, the detection unit 230 may detect that a splitter having a movable boundary position is to be generated by considering that the sides of the component display areas adjacent to each other overlap each other.

Figure 6:
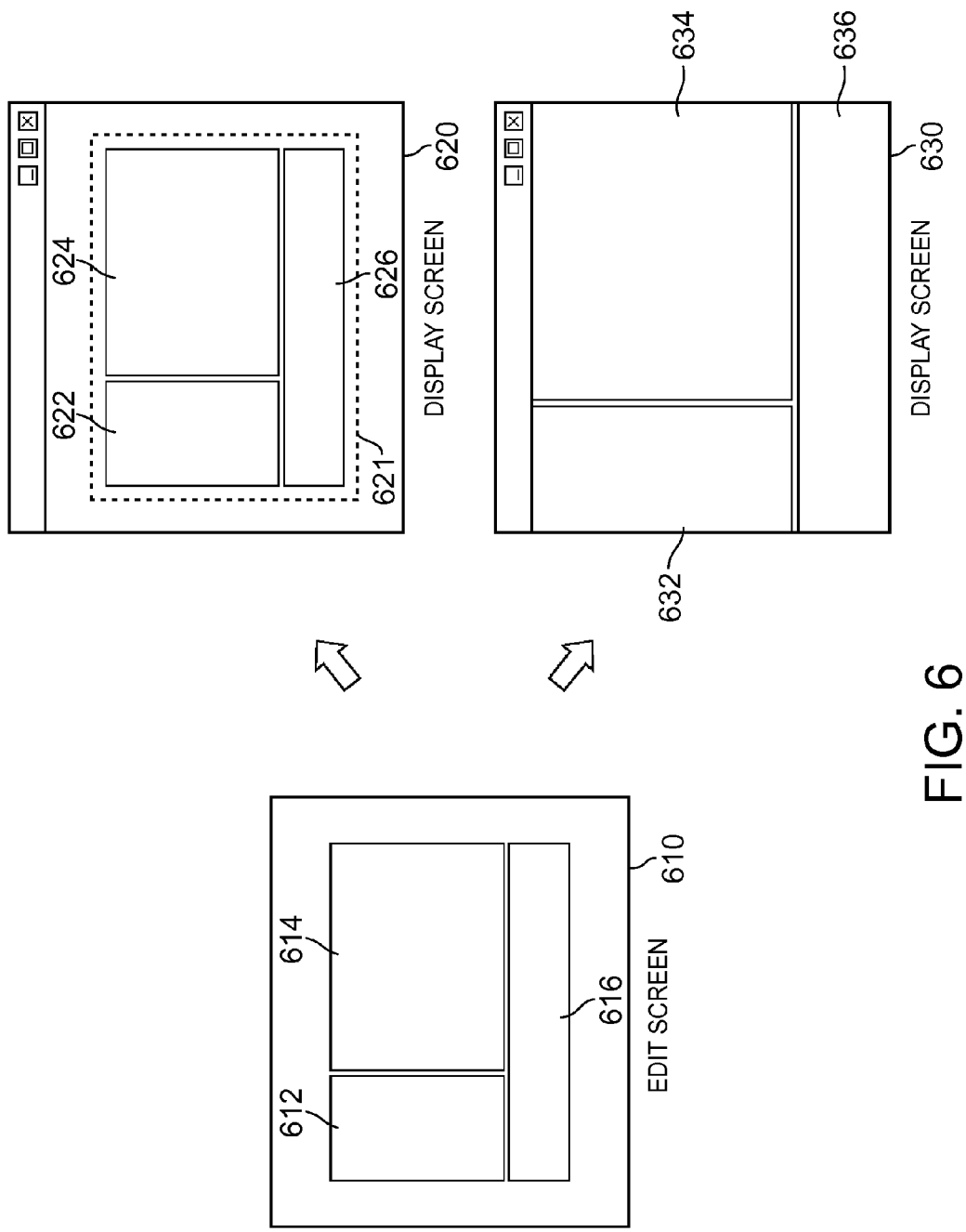
FIG. 6 is a diagram illustrating an example of an arrangement condition corresponding to a split container according to another embodiment.

FIG. 6 shows an example of an arrangement condition corresponding to a split container according to another embodiment. If display areas 612, 614, and 616 for a plurality of components in an edit screen 610 are arranged in the display screen with the absolute coordinate arrangement maintained, the display unit 260 does not display the corresponding display parts for the plurality of components so as to follow the window size even if the application user changes the window size of the display screen and therefore the display screen is inconvenient to the application user.

In this embodiment, the detection unit 230 detects that the display areas 612, 614, and 616 for the plurality of components have the positional relationship in which the display areas 612, 614, and 616 substantially border the adjacent component display areas, respectively. The generation unit 240 generates a split container for displaying a display area, which is split into component display parts 622, 624, and 626, on a part of or the entire display screen, while matching the ratio of the sizes of the display areas 612, 614, and 616 for the plurality of components in the edit screen 610 with the ratio of the sizes of the corresponding component display parts 622, 624, and 626, and adds the split container to the layout of the display screen.

A split container 621 is used to display the component display parts 622, 624, and 626 onto a part of the display screen 620. In a display screen 630, there is shown a split container for displaying the component display parts 622, 624, and 626 onto the entire display screen 630. The display unit 260 resizes the size of the display parts for the plurality of components so as to follow the window size of the display screen 620 or 630 and displays the display parts as the component display parts 632, 634, and 636, respectively, and therefore the present invention is able to provide the display screen 620 or 630 which is easy to use by the application user.

Figure 7:
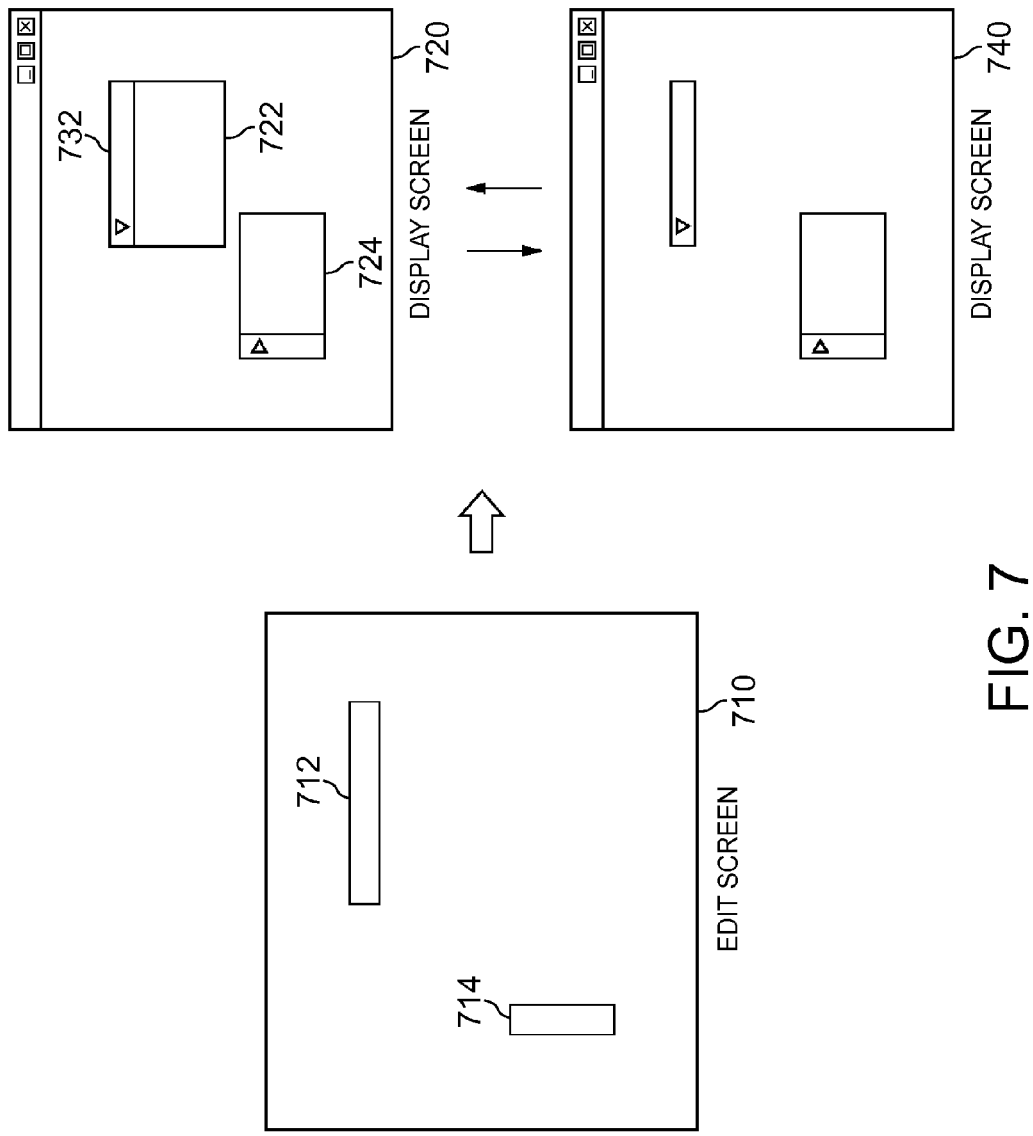
FIG. 7 is a diagram illustrating an example of an arrangement condition corresponding to a section container, which is an example of a layout container, which is collapsible in the vertical or horizontal direction, according to another embodiment.

FIG. 7 shows an example of an arrangement condition corresponding to a section container, which is an example of a layout container collapsible in the vertical or horizontal direction, according to another embodiment. The detection unit 230 may detect a display area where the ratio of the vertical length to the horizontal length or the ratio of the horizontal length to the vertical length is less than a predetermined ratio. In this case, the generation unit 240 may generate a section container, in which the application user switches between display and hide (collapse) of the display contents by clicking on a tab section, and then add the section container to the layout of the display screen.

For example, in an edit screen 710, the detection unit 230 detects that the ratio of the vertical length to the horizontal length of a component display area 712 is less than a predetermined ratio. In response to this, the generation unit 240 generates a corresponding section container 722 and adds the section container 722 to the layout of a display screen 720. Further, for example, if the detection unit 230 detects that the ratio of the horizontal length to the vertical length of a component display area 714 is less than a predetermined ratio in the edit screen 710, the generation unit 240 generates a section container 724 corresponding to the component display area 714 and adds the section container 724 to the layout of a display screen 720. If the application user clicks on a tab section 732 in the display screen 720, the display unit 260 displays the display screen 740 in which the display content of the section container 722 corresponding to the tab section 732 is collapsed.

Figure 8:
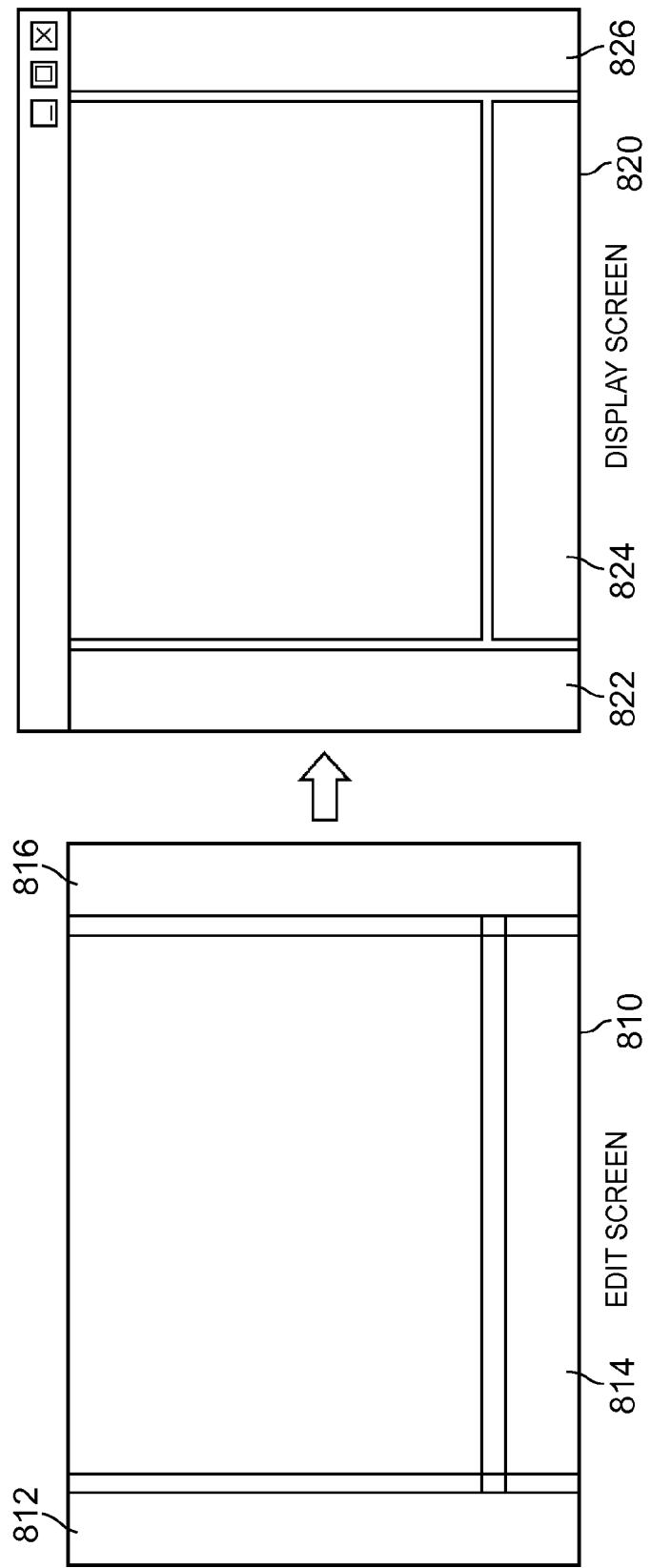
FIG. 8 is a diagram illustrating an example of an arrangement condition corresponding to a side bar, which is an example of a layout container, which enables a hide state to be set by collapsing the side bar at a screen edge, according to another embodiment.

FIG. 8 shows an example of an arrangement condition corresponding to a side bar, which is an example of a layout container, which enables a hide state by collapsing a display area to a screen edge, according to another embodiment. The detection unit 230 may also detect a display area whose one side borders one of the top, bottom, right, and left edges of the screen and whose ratio of the short side length to the long side length is less than a predetermined ratio.

For example, in an edit screen 810, the detection unit 230 detects component display areas 812, 814, and 816 whose left, bottom, and right sides border the left, bottom, and right edges of the edit screen 810, respectively, and whose ratio of the short side length to the long side length is less than a predetermined ratio. The generation unit 240 generates side bars 822, 824, and 826 corresponding to the component display areas 812, 814, and 816, respectively, and adds the side bars 822, 824, and 826 to the layout of the display screen 820. For example, if the application user operates the side bars 822, 824, and 826, the display unit 260 hides the side bars 822, 824, and 826 by collapsing them to the respective edges of the screen.

Figure 9:
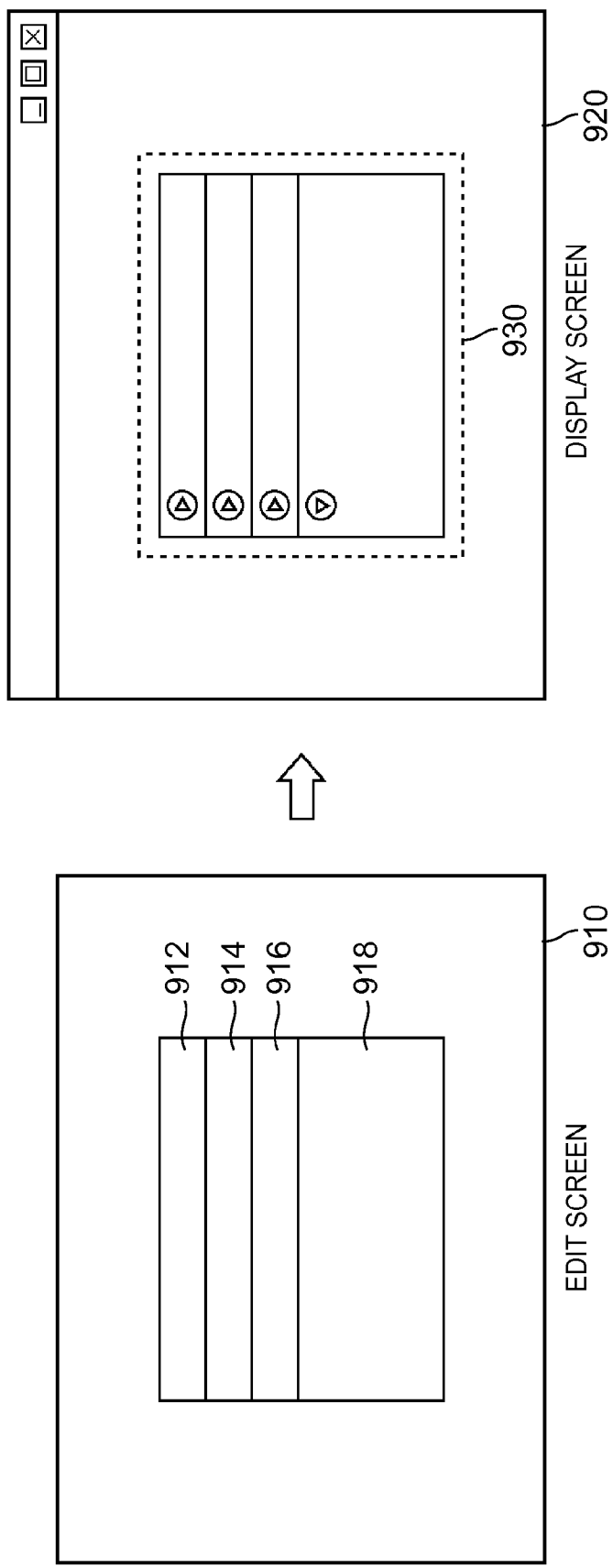
FIG. 9 is a diagram illustrating an example of an arrangement condition corresponding to an accordion container, in which the display contents of components are stacked in the vertical direction, according to another embodiment.
Figure 10:
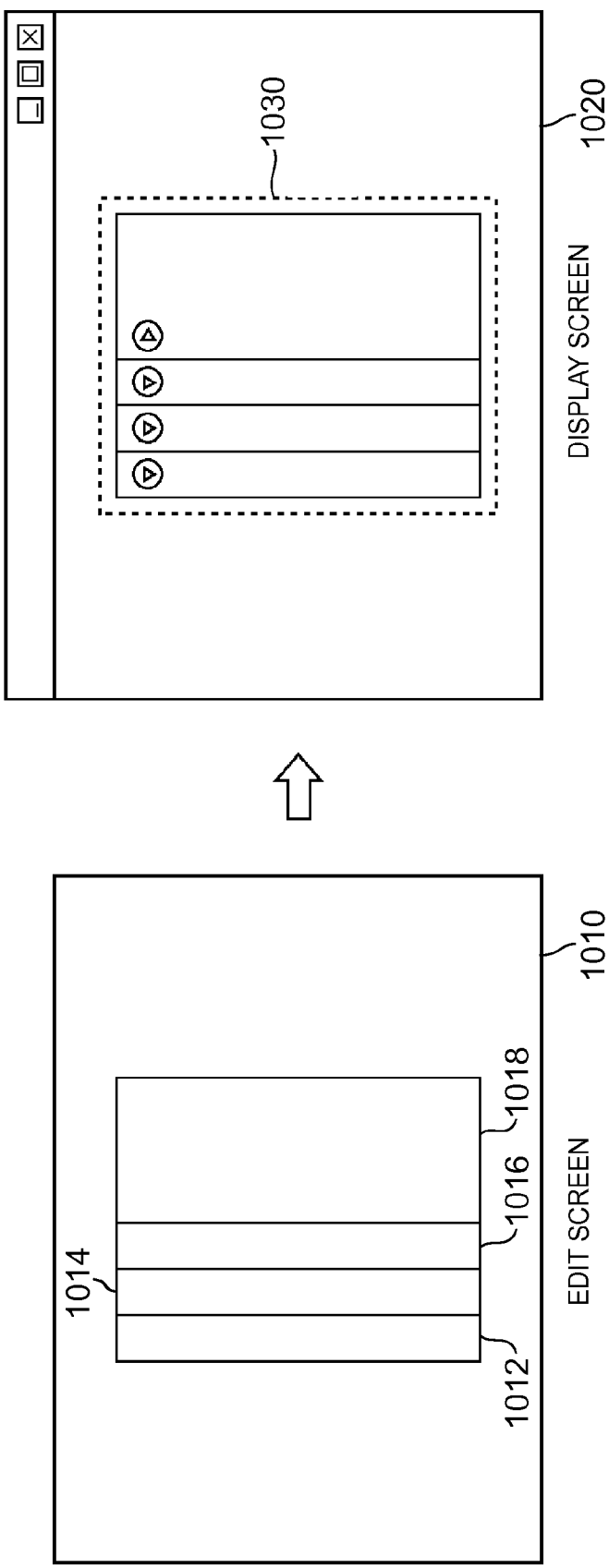
FIG. 10 is a diagram illustrating an example of an arrangement condition corresponding to an accordion container, in which the display contents of components are stacked in the horizontal direction, according to another embodiment.

FIG. 9 and FIG. 10 show examples of arrangement conditions corresponding to an accordion container, in which the display contents of the components are stacked in the vertical or horizontal direction, according to one or more other embodiments. The detection unit 230 detects a plurality of target display areas having a predetermined overlapping relationship from a plurality of display areas. For example, the detection unit 230 detects two or more display areas, which overlap by a predetermined first standard ratio or more with being shifted in one of the vertical and horizontal directions, as a plurality of target display areas. In this case, a plurality of tab sections are arranged in one of the vertical and horizontal directions, each having a length extending in a direction different from the shift direction of the display areas. When one of the tab sections is selected, the generation unit 240 may generate an accordion container, in which the display content of the corresponding target display area is displayed between the selected tab section and the next tab section while hiding the display contents of the target display areas corresponding to the tab sections not selected. In this regard, the first standard ratio may be defined individually for the horizontal and vertical directions.

In FIG. 9, the detection unit 230 detects two or more display areas, which overlap by a predetermined first standard ratio or more with being shifted in the vertical direction, as a plurality of target display areas. In an edit screen 910, the detection unit 230 detects that component target display areas 912, 914, 916, and 918 sufficiently overlap downward in the edit screen 910 by determining that the ratio of the vertical overlap width of the component display areas 912 and 914 to the vertical length of the component display area 912 is equal to or more than the first standard ratio, that the ratio of the vertical overlap width of the component display areas 914 and 916 to the vertical length of the component display area 914 is equal to or more than the first standard ratio, and that the ratio of the vertical overlap width of the component display areas 916 and 918 to the vertical length of the component display area 916 is equal to or more than the first standard ratio, and further determining that the horizontal shift length between the component display areas 912, 914, 916, and 918 is less than a standard ratio. In response to this, the generation unit 240 generates a corresponding accordion container 930 and adds it to the layout of a display screen 920.

In the example of FIG. 10, the detection unit 230 detects two or more display areas, which overlap by the predetermined first standard ratio or more with being shifted in the horizontal direction, as a plurality of target display areas. In an edit screen 1010, the detection unit 230 detects that component display areas 1012, 1014, 1016, and 1018 are a plurality of target display areas sufficiently overlapping rightward in the edit screen 1010 by determining that the ratio of the horizontal overlap width of the component display areas 1012 and 1014 to the horizontal length of the component display area 1012 is equal to or more than the first standard ratio, that the ratio of the horizontal overlap width of the component display areas 1014 and 1016 to the horizontal length of the component display area 1014 is equal to or more than the first standard ratio, and that the ratio of the horizontal overlap width of the component display areas 1016 and 1018 to the horizontal length of the component display area 1016 is equal to or more than the first standard ratio, and further determining that the vertical shift length between the component display areas 1012, 1014, 1016, and 1018 is less than the standard ratio. In response to this, the generation unit 240 generates a corresponding accordion container 1030 and adds it to the layout of a display screen 1020.

Figure 11:
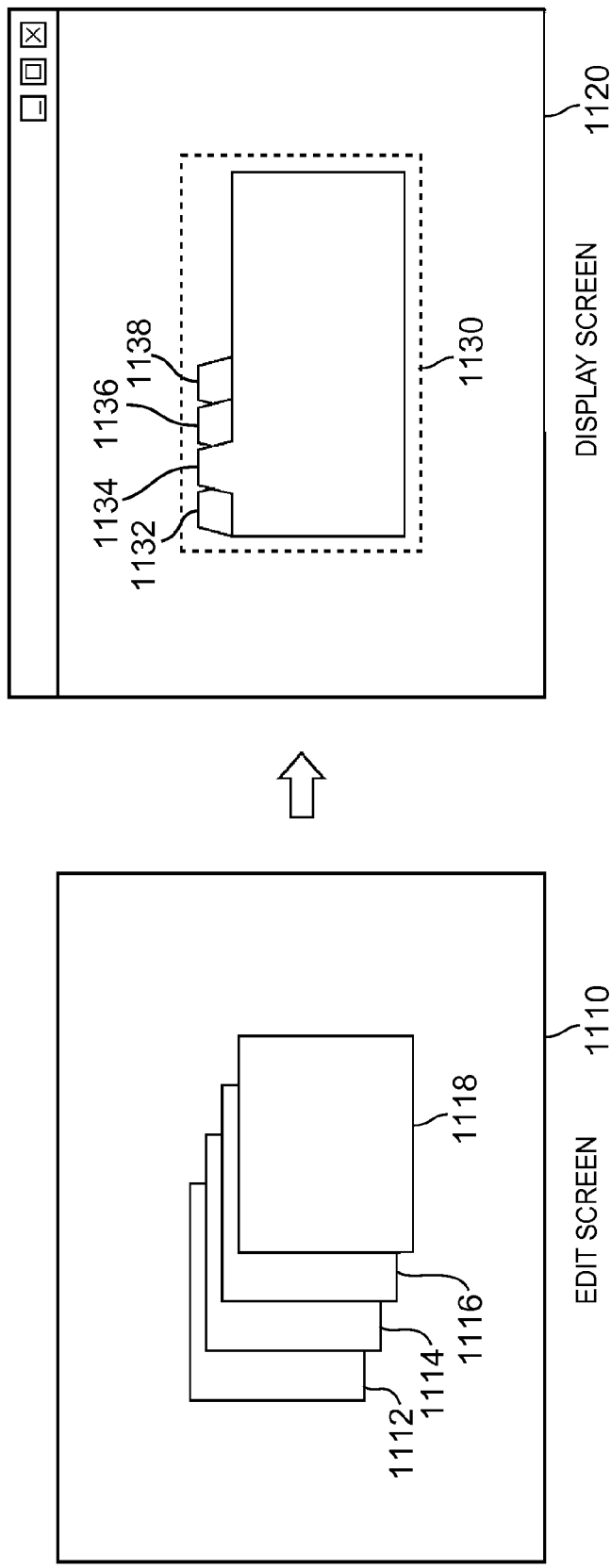
FIG. 11 is a diagram illustrating an example of an arrangement condition corresponding to a tab panel, which has tabs on the upper side, according to another embodiment.

FIG. 11 shows an example of an arrangement condition corresponding to a tab panel, which has tabs on the upper or lower side, according to another embodiment. The detection unit 230 may detect two or more display areas, which are arranged so as to overlap by a predetermined second standard ratio or more with being shifted, as a plurality of target display areas. In this case, the generation unit 240 may generate a tab container (tab panel) having a plurality of tab sections corresponding to the plurality of target display areas and a display section for displaying the display content of a target display area corresponding to a tab section selected from the plurality of tab sections and add the tab container to the layout of the display screen. The generation unit 240 may arrange the plurality of tab sections in the horizontal direction in the case where the direction of the arrangement in which the plurality of target display areas are arranged with being respectively shifted is relatively close to the horizontal direction.

For example, in the edit screen 1110, the detection unit 230 detects that component display areas 1112, 1114, 1116, and 1118 are a plurality of target display areas overlapping rightward and slightly obliquely downward by determining that the rate of the downward shift length to the rightward shift length of the component display areas 1112, 1114, 1116, and 1118 is equal to or less than the standard ratio. In response to this, the generation unit 240 may generate a tab panel 1130, which has tabs arranged in the horizontal direction at the upper left, and add the tab panel 1130 to the layout of a display screen 1120.

The generation unit 240 may determine the order of the plurality of tab sections according to the overlap order of the plurality of target display areas. The generation unit 240 may determine the order of the plurality of tab sections according to the order of z-index of the plurality of components. For example, the generation unit 240 may arrange tab sections 1132, 1134, 1136, and 1138 corresponding to the display areas 1112, 1114, 1116, and 1118 for the plurality of components, respectively, in the descending order of z-index of the plurality of components, and may arrange the tab sections in the ascending order of z-index.

Figure 12:
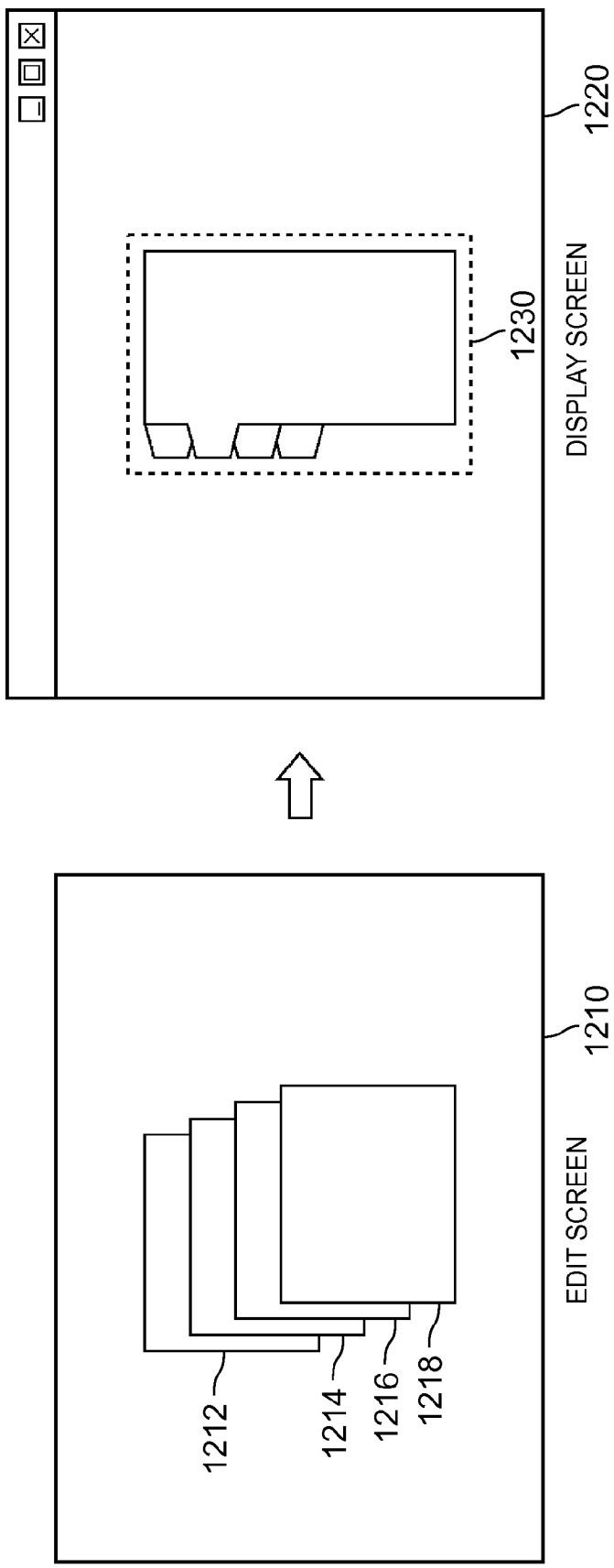
FIG. 12 is a diagram illustrating an example of an arrangement condition corresponding to a tab panel, which has tabs on the left-hand side, according to another embodiment.

FIG. 12 shows an example of an arrangement condition corresponding to a tab panel, which has tabs on the left-hand side, according to another embodiment. For example, the detection unit 230 detects that display areas 1212, 1214, 1216, and 1218 for a plurality of components are target display areas sufficiently overlapping downward and slightly obliquely rightward by determining that the rate of the rightward shift length to the downward shift length of the display areas 1212, 1214, 1116, and 1218 for the plurality of components is equal to or less than the standard ratio. In response to this, the generation unit 240 may generate a tab panel 1230, which has tabs arranged in the vertical direction at the upper left, and add the tab panel 1230 to the layout of a display screen 1220.

Similarly, the generation unit 240 may generate a tab panel, which has tabs arranged in the horizontal direction at the upper right, if the direction of the arrangement of the display areas for the plurality of components is leftward and slightly downward. Table 1 shows an example of a relationship among the arrangement direction of the target display areas for the plurality of components, the orientation of the arrangement direction, the position of tab sections, and the direction of tab sections.

TABLE 1

Example of relationship among the arrangement direction, the position of tab sections, and the direction of tab sections

| In edit screen | | In display screen | |
| --- | --- | --- | --- |
| Arrangement direction of target display areas | Orientation of arrangement direction | Position of tab sections | Direction of tab sections |
| Rightward | Downward | Upper left | Horizontal |
| Downward | Rightward | Upper left | Vertical |
| Rightward | Upward | Lower left | Horizontal |
| Upward | Rightward | Lower left | Vertical |
| Leftward | Downward | Upper right | Horizontal |
| Downward | Leftward | Upper right | Vertical |
| Leftward | Upward | Lower right | Horizontal |
| Upward | Leftward | Lower right | Vertical |

Moreover, if the detection unit 230 detects that the ratio of the overlap width to the vertical or horizontal length of the display areas for the plurality of components is greater than a predetermined reference value, the generation unit 240 may generate a pager instead of the tab panel. Further, if the detection unit 230 detects that the number of overlapping display areas for the plurality of components is greater than a predetermined value, the generation unit 240 may generate a pager instead of the tab panel. Still further, if the detection unit 230 detects that the ratio of the horizontal shift length to the vertical shift length of the display areas for the plurality of components is within a predetermined range, the generation unit 240 may generate a pager instead of the tab panel.

Figure 13:
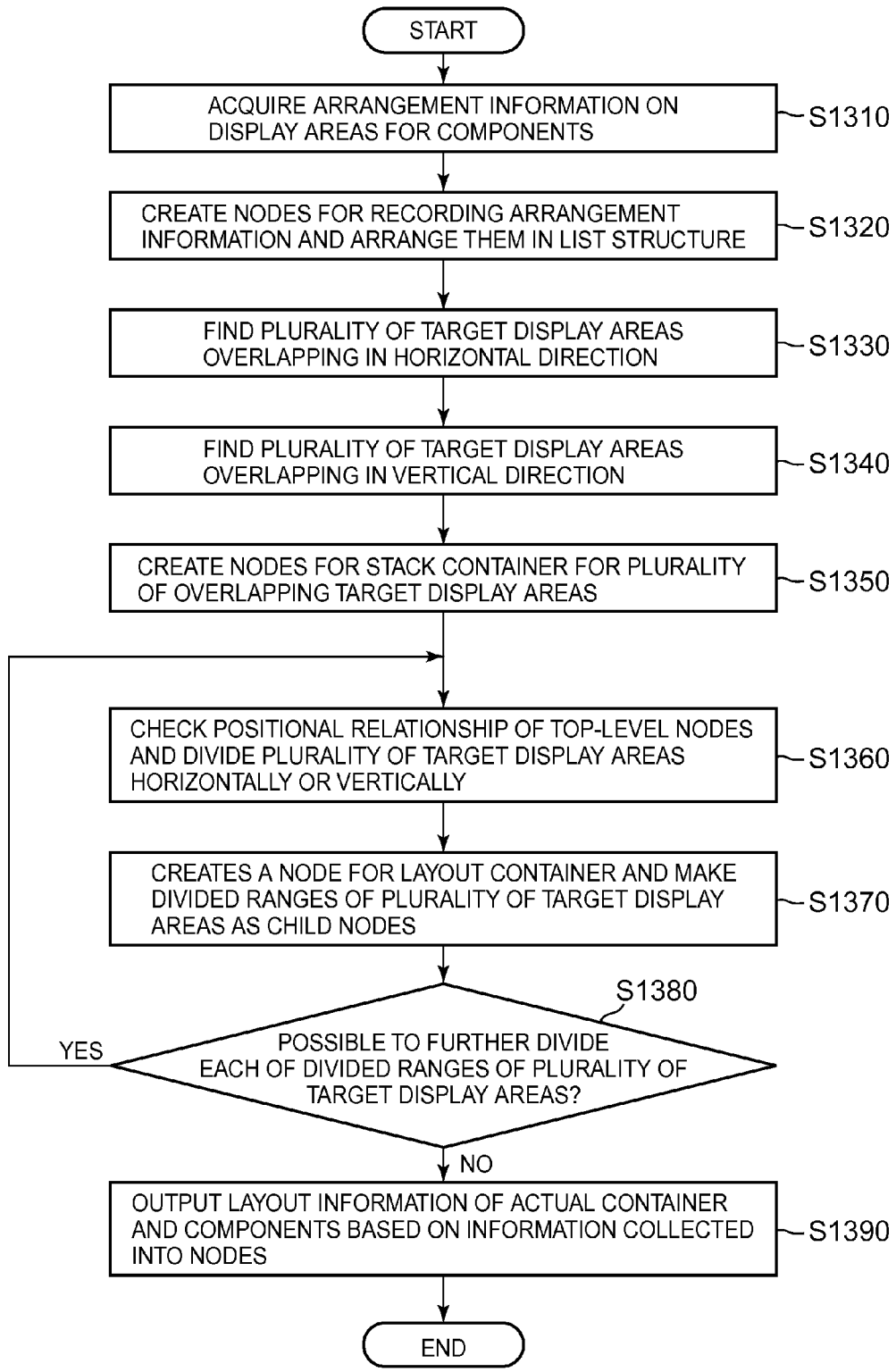
FIG. 13 is a diagram illustrating an example of a processing flow of a detection unit 230, a generation unit 240, and an output unit 250 according to another embodiment.

FIG. 13 shows an example of a processing flow of a detection unit 230, a generation unit 240, and an output unit 250 according to another embodiment. First, the detection unit 230 acquires arrangement information on the display areas for the components from the editing device 105 or the storage device 130 (S1310).

The detection unit 230 creates nodes for recording the arrangement information and arranges the nodes in a list structure (S1320). Here, the term "list structure" can mean a data structure in which the nodes are arranged in a straight line. The detection unit 230 may generate any other data structure, which is capable of representing straight-line nodes such as, for example, an array, instead of the list structure.

The detection unit 230 finds a plurality of target display areas overlapping in the horizontal direction (S1330). Subsequently, the detection unit 230 finds a plurality of target display areas overlapping in the vertical direction (S1340). The order of steps S1330 and S1340 may be reversed.

The generation unit 240 creates nodes for a stack container for a plurality of overlapping target display areas (S1350). In this manner, the generation unit 240 generates layout information including a stack container by using the tree structure.

The detection unit 230 checks a positional relationship of top-level nodes and divides the plurality of target display areas horizontally or vertically (S1360). Subsequently, the generation unit 240 creates a node for a layout container and makes the divided ranges of the plurality of target display areas its child nodes, respectively (S1370). In this manner, the generation unit 240 generates layout information including layout containers by using the tree structure.

The detection unit 230 determines whether it is possible to further divide each of the divided ranges of the plurality of target display areas (S1380). If possible, the detection unit 230 detects and groups two or more display areas having a predetermined overlapping relationship from the plurality of display areas and detects and further groups a plurality of target display areas having a predetermined positional relationship from the grouped two or more display areas and other display areas. Subsequently, the generation unit 240 generates a container, in which the display contents of the plurality of target display areas are unified and displayed within a unified display area with respect to each group, and then adds the container to the layout of the display screen.

The output unit 250 outputs the layout information of the actual container and components on the basis of the information collected into the nodes (S1390). Thereby, the display unit 260 is able to display a container made of a combination of a plurality of types of containers on the basis of the layout information input from the output unit 250.

Figure 14A:
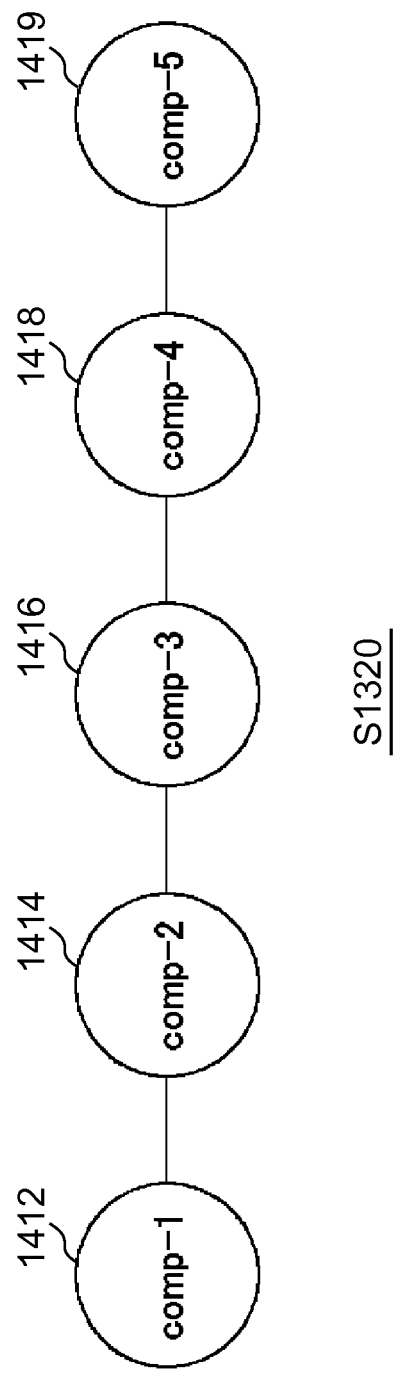
FIG. 14A is a diagram illustrating an example of a list structure in step S1320 of FIG. 13.

FIG. 14A shows an example of the list structure in step S1320 of FIG. 13. The detection unit 230 generates the list structure from nodes 1412, 1414, 1416, 1418, and 1419 corresponding to the plurality of display areas.

Figure 14B:
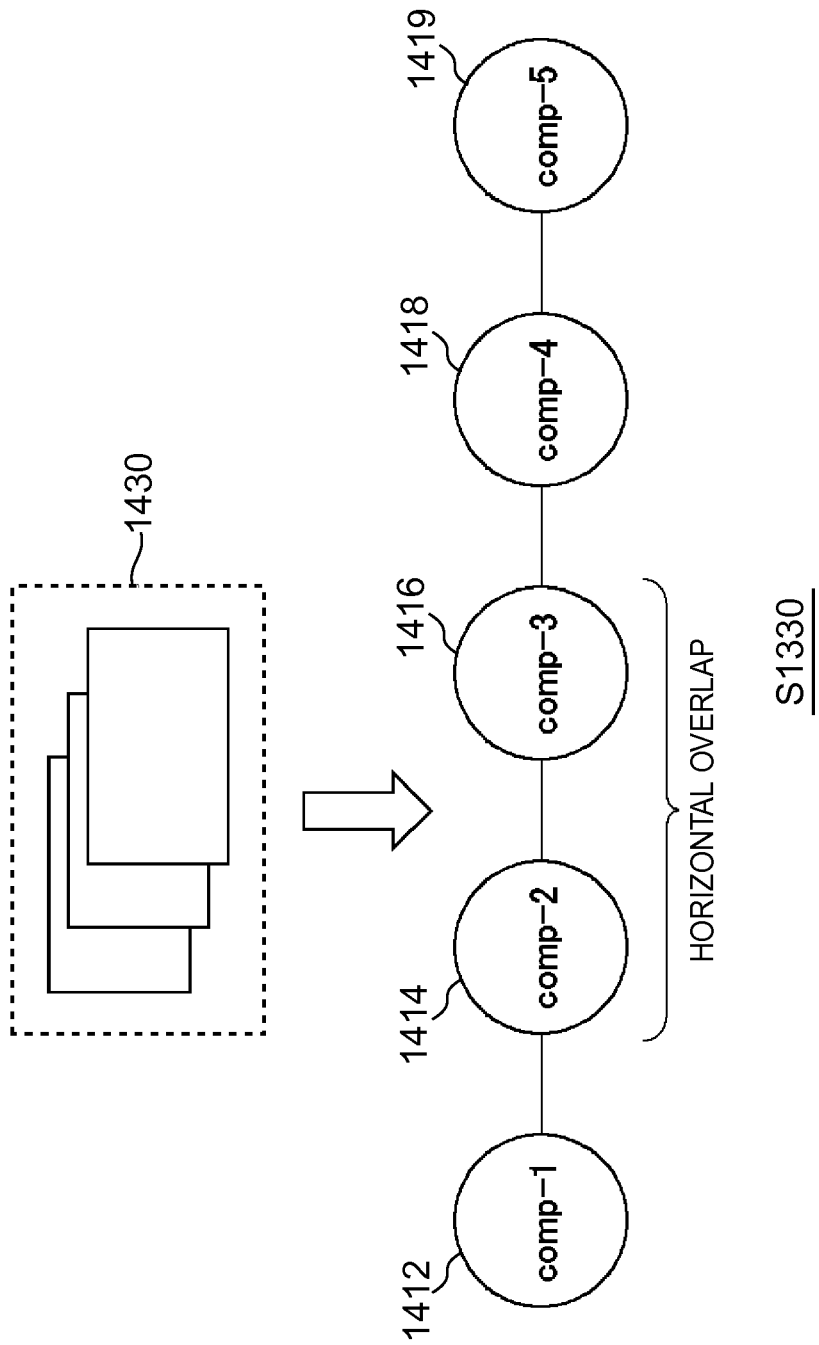
FIG. 14B is a diagram illustrating an example of processing in step S1330 of FIG. 13.

FIG. 14B shows an example of the processing in step S1330 of FIG. 13. The detection unit 230 detects that a plurality of target display areas 1430 corresponding to the nodes 1414 and 1416 and the like overlap in the horizontal direction.

Figure 14C:
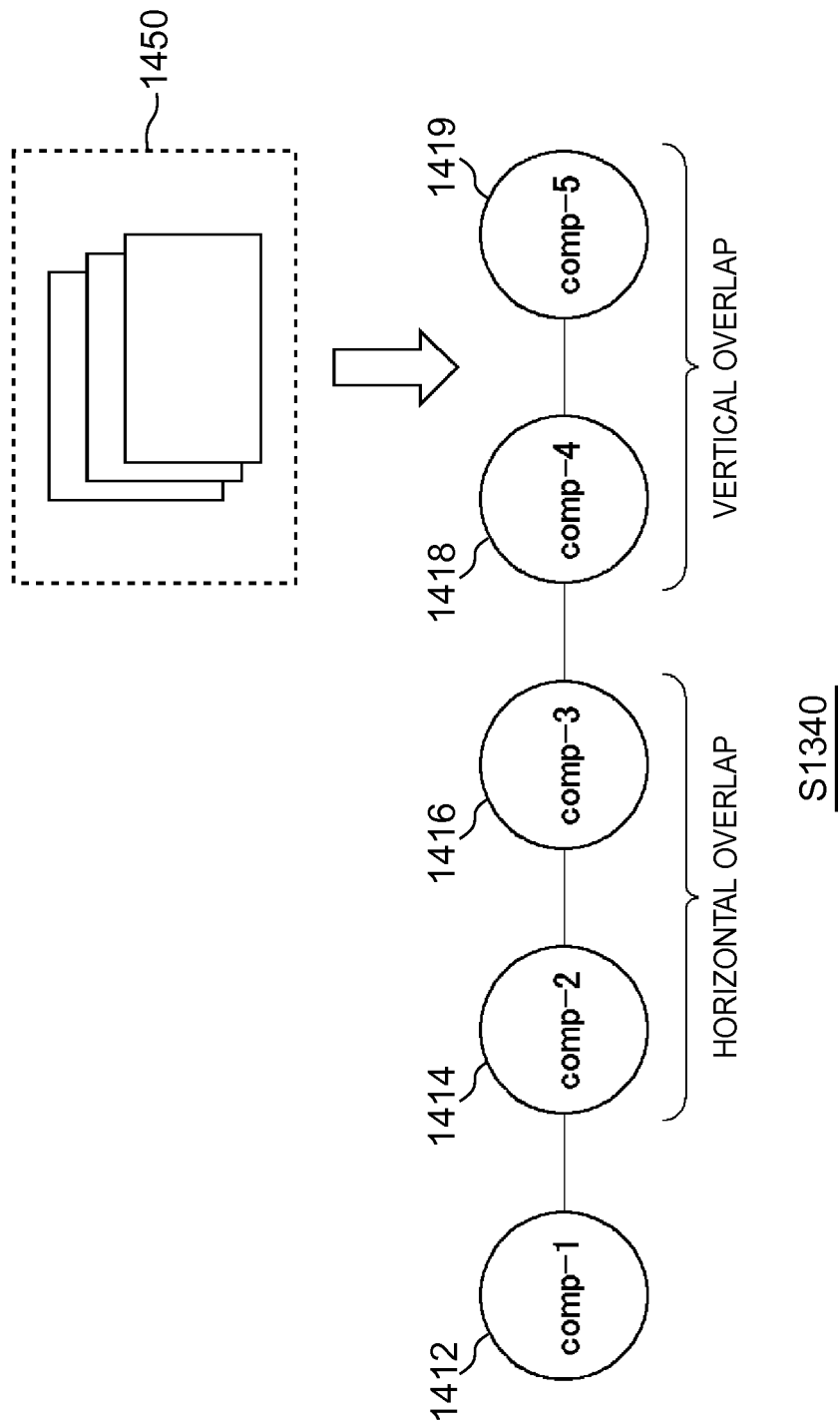
FIG. 14C is a diagram illustrating an example of processing in step S1340 of FIG. 13.

FIG. 14C shows an example of the processing in step S1340 of FIG. 13. The detection unit 230 detects that a plurality of target display areas 1450 corresponding to the nodes 1418 and 1419 overlap in the vertical direction.

Figure 14D:
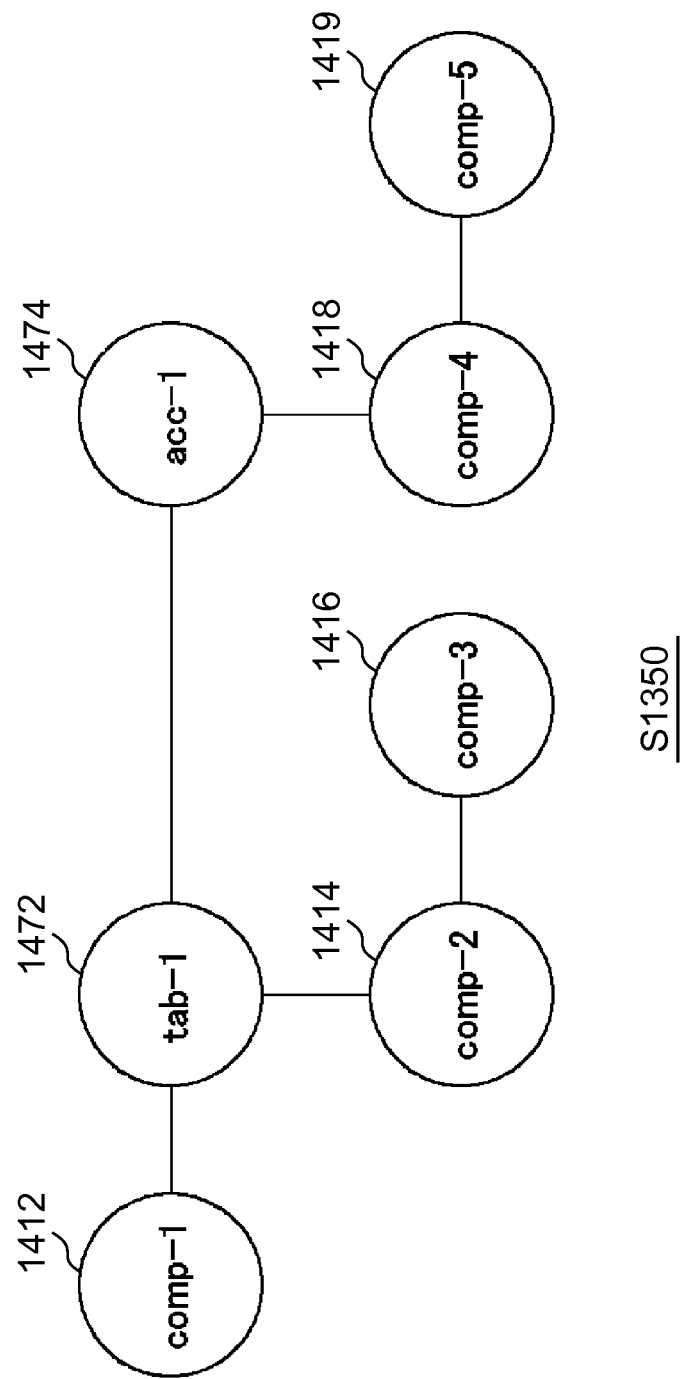
FIG. 14D is a diagram illustrating an example of a tree structure of nodes for a stack container generated in step S1350 of FIG. 13.

FIG. 14D shows an example of the tree structure of the nodes for the stack container generated in step S1350 of FIG. 13. The generation unit 240 generates a node 1472 corresponding to a tab panel for the nodes 1414 and 1416 corresponding to the overlapping target display areas and makes the nodes 1414 and 1416 child nodes of the node 1472. Similarly, the generation unit 240 generates a node 1474 corresponding to an accordion container for the nodes 1418 and 1419 corresponding to the overlapping target display areas and makes the nodes 1418 and 1419 child nodes of the node 1474.

Figure 15A:
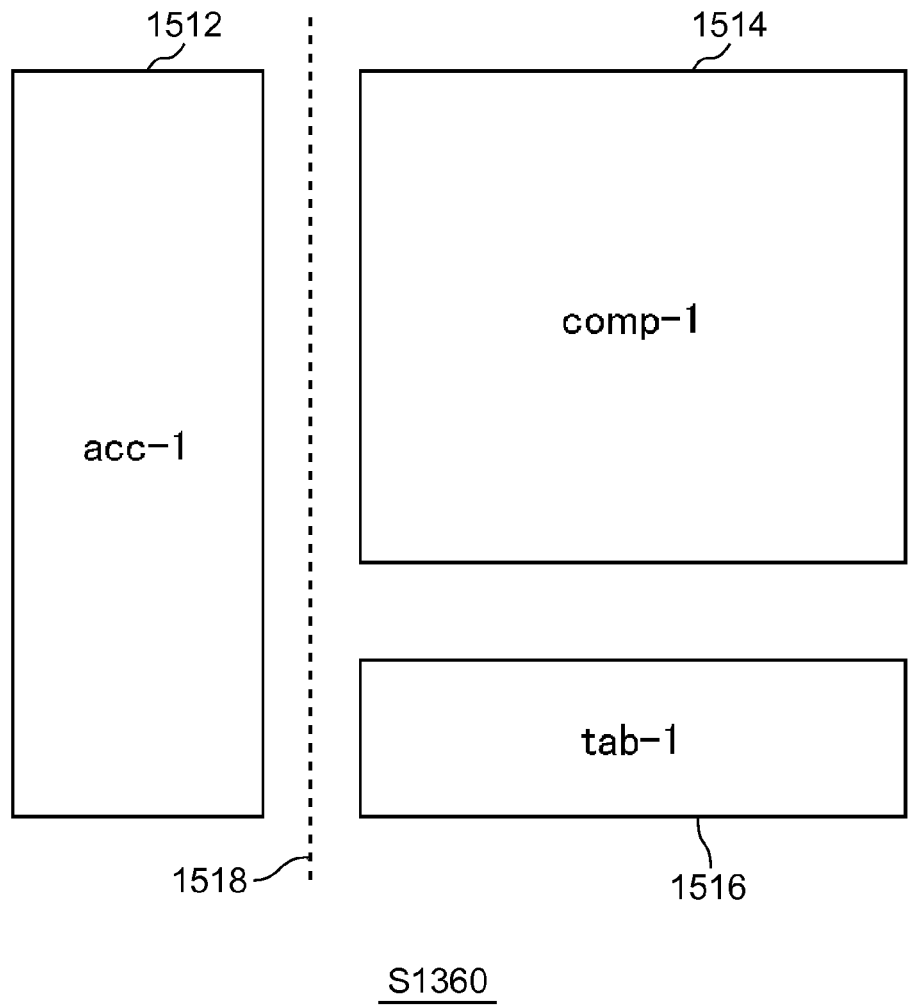
FIG. 15A is a diagram illustrating an example of a horizontal division in step S1360 of FIG. 13.

FIG. 15A shows an example of the horizontal division in step S1360 of FIG. 13. The detection unit 230 detects that it is possible to divide a group composed of a target display area 1512 and a group composed of target display areas 1514 and 1516 in the horizontal direction with a vertical line 1518.

Figure 15B:
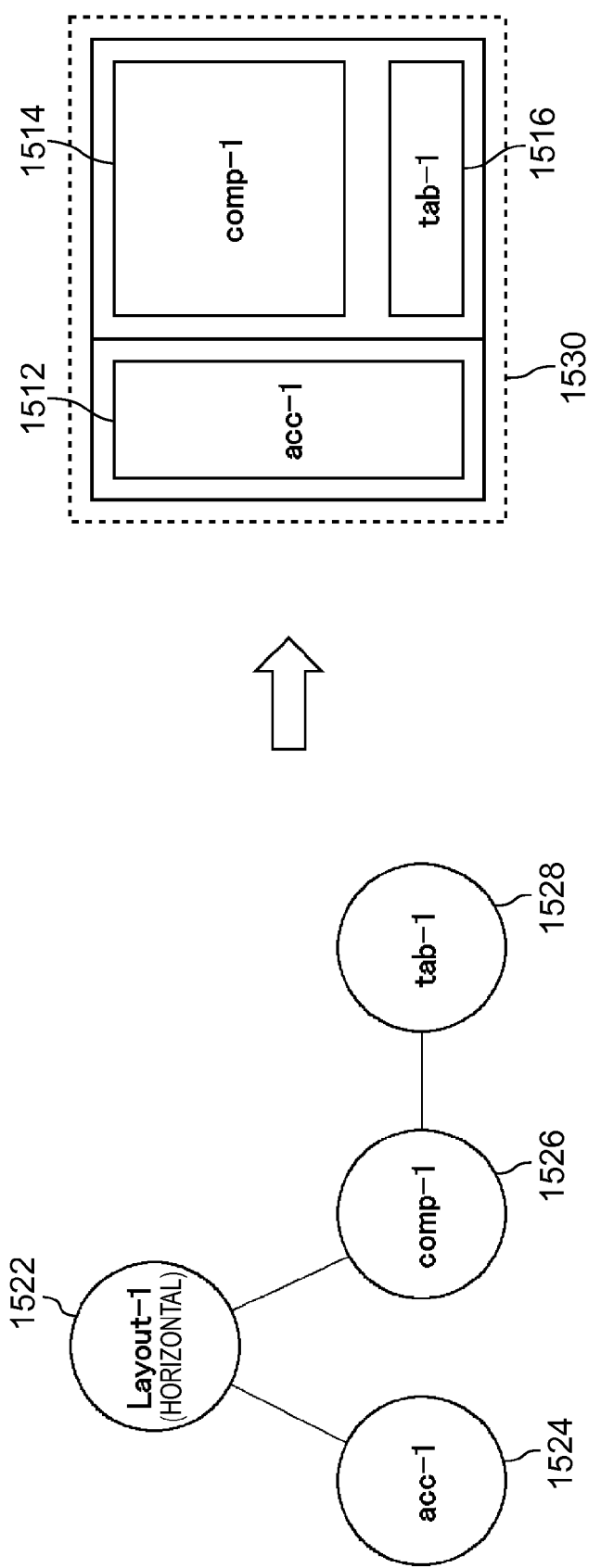
FIG. 15B is a diagram illustrating an example of processing in step S1370 of FIG. 13.

FIG. 15B shows an example of the processing in step S1370 of FIG. 13. The generation unit 240 generates a node 1522 for the layout container having a horizontally divided display part and makes nodes 1524 and 1526 child nodes of the node 1522.

Figure 15C:
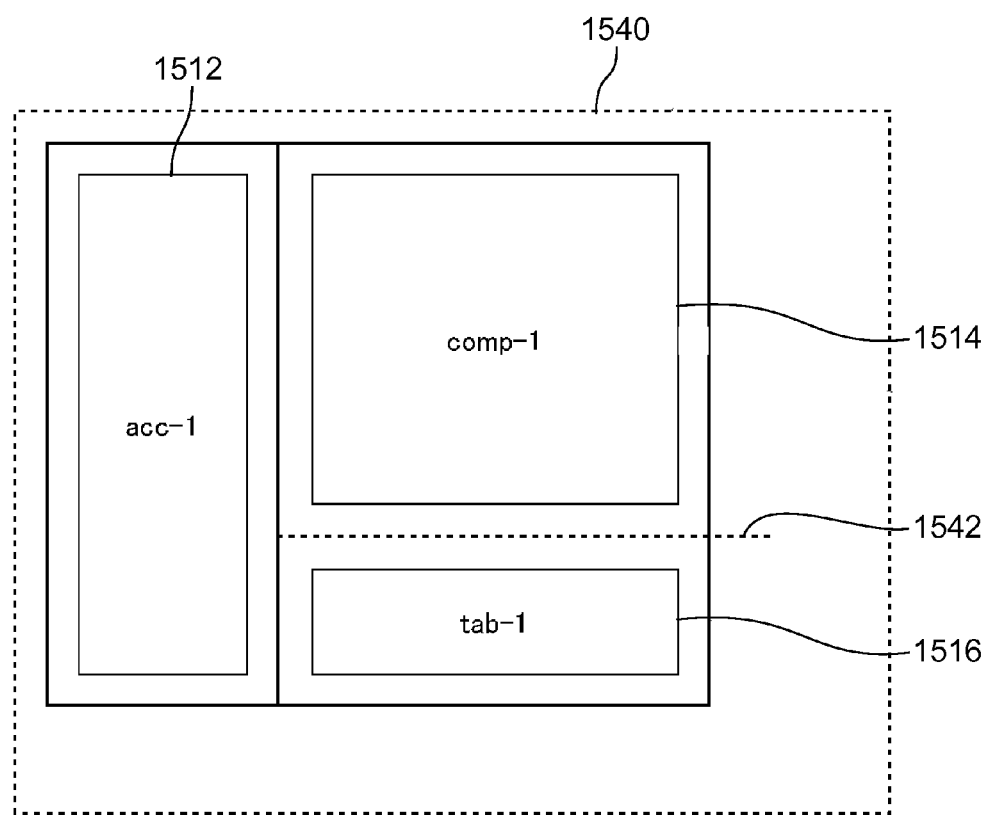
FIG. 15C is a diagram illustrating an example of a vertical division in step S1360 of FIG. 13.

FIG. 15C shows an example of the vertical division in step S1360 of FIG. 13. The detection unit 230 detects that it is possible to divide the group composed of the target display area 1514 and the group composed of the target display area 1516 in the vertical direction.

Figure 15D:
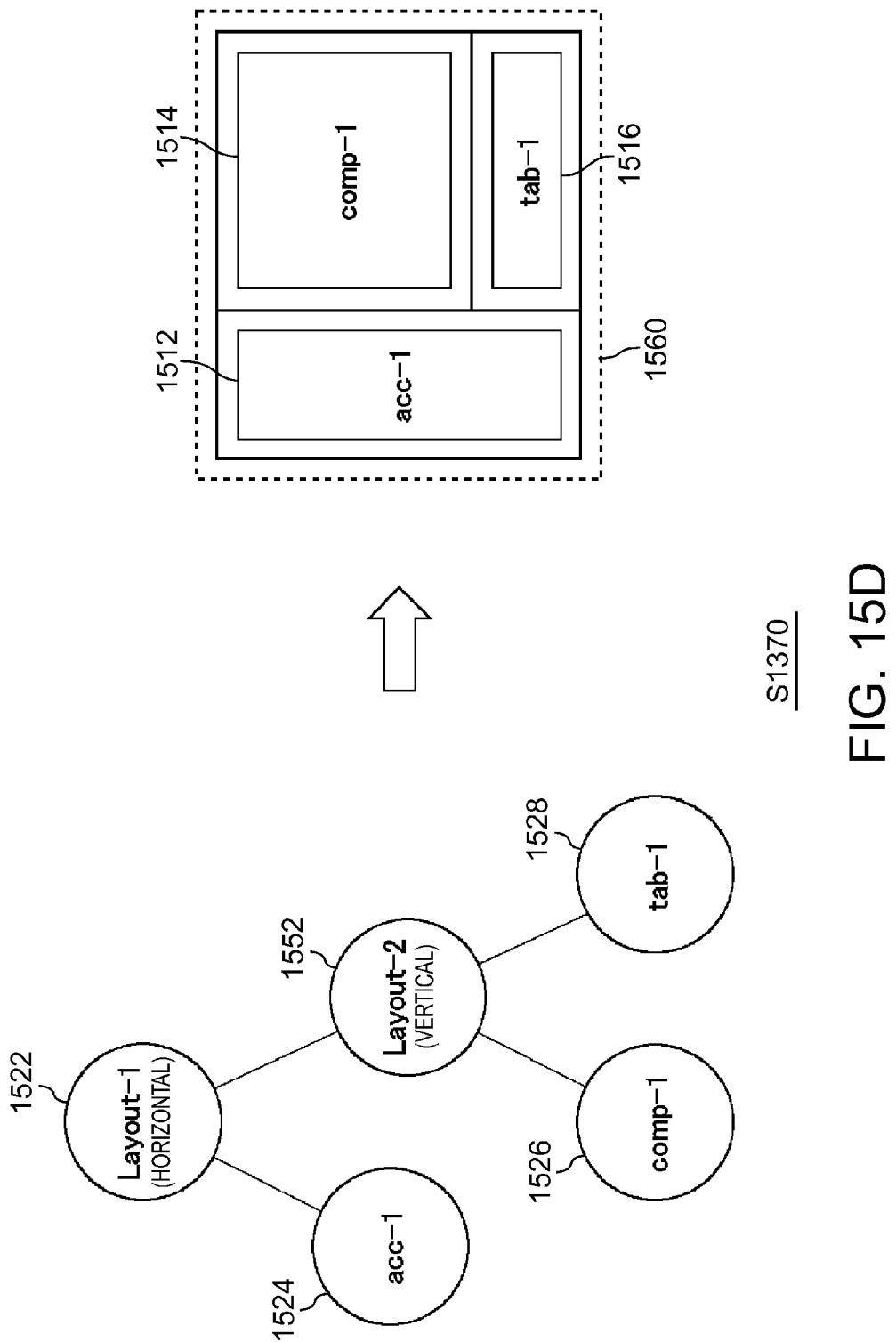
FIG. 15D is a diagram illustrating an example of processing in step S1370 of FIG. 13.

FIG. 15D shows an example of the processing in step S1370 of FIG. 13. The generation unit 240 generates a node 1552 for the layout container having a vertically-divided display part and makes nodes 1526 and 1528 child nodes of the node 1552.

Figure 16:
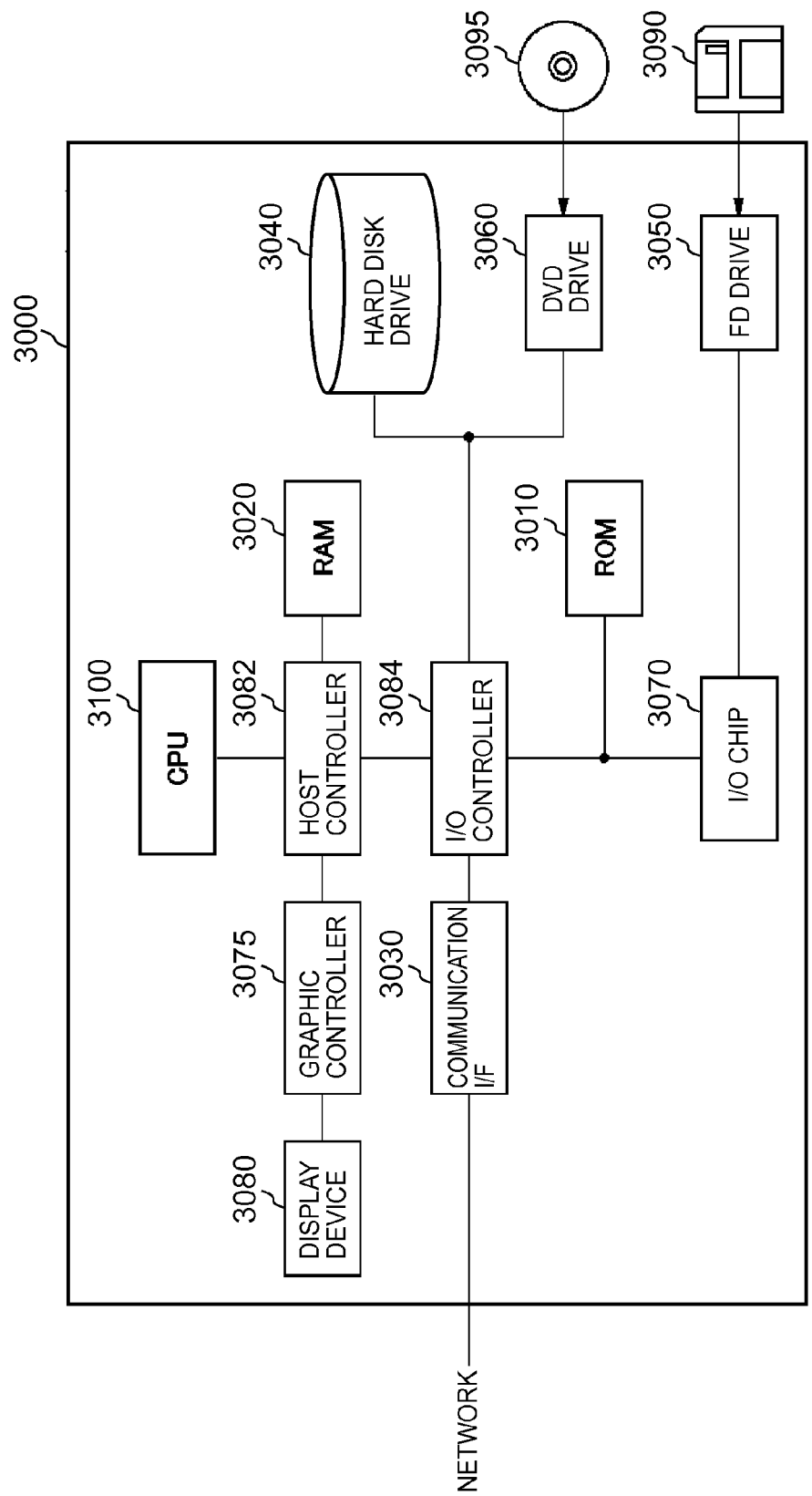
FIG. 16 is a diagram illustrating an example of a hardware configuration of a computer 3000 according to another embodiment.

FIG. 16 shows an example of a hardware configuration of a computer 3000 according to this embodiment. The computer 3000 according to this embodiment includes: a CPU peripheral unit having a CPU 3100, a RAM 3020, a graphic controller 3075, and a display device 3080 connected to each other via a host controller 3082; an I/O unit having a communication interface 3030 connected to a host controller 3082 via an I/O controller 3084, a hard disk drive 3040, and a DVD drive 3060; and a legacy I/O unit having a ROM 3010 connected to the I/O controller 3084, a flexible disk drive 3050, and an I/O chip 3070.

The host controller 3082 connects the RAM 3020 to the CPU 3100 and the graphic controller 3075, which access the RAM 3020 at a high transfer rate. The CPU 3100 operates on the basis of programs stored in the ROM 3010 and the RAM 3020 and controls the individual units. The graphic controller 3075 acquires image data generated in a frame buffer provided in the RAM 3020 by the CPU 3100 or the like and displays the image data onto the display device 3080. Alternatively, the graphic controller 3075 may include a frame buffer for storing image data generated by the CPU 3100 or the like inside.

The I/O controller 3084 connects the host controller 3082 to the communication interface 3030, the hard disk drive 3040, and the DVD drive 3060, which are relatively high-speed I/O devices. The communication interface 3030 communicates with other devices via a network. The hard disk drive 3040 stores programs and data used by the CPU 3100 in the computer 3000. The DVD drive 3060 reads programs or data from a DVD 3095 and supplies the programs or data to the hard disk drive 3040 via the RAM 3020.

Moreover, the ROM 3010, the flexible disk drive 3050, and the I/O chip 3070, which are relatively low-speed I/O devices, are connected to the I/O controller 3084. The ROM 3010 stores a boot program which is executed at the time of startup by the computer 3000 and/or programs or the like which depend on the hardware of the computer 3000. The flexible disk drive 3050 reads programs or data from a flexible disk 3090 and supplies the programs or data to the hard disk drive 3040 via the RAM 3020. The I/O chip 3070 connects the flexible disk drive 3050 to the I/O controller 3084 and connects various types of I/O devices to the I/O controller 3084 via, for example, a parallel port, a serial port, a keyboard port, a mouse port, and the like.

Programs to be supplied to the hard disk drive 3040 via the RAM 3020 are stored in a recording medium such as the flexible disk 3090, the DVD 3095, or an IC card and supplied by a user. The programs are read from the recording medium, installed in the hard disk drive 3040 in the computer 3000 via the RAM 3020, and executed in the CPU 3100.

Programs installed in the computer 3000 to cause the computer 3000 to function as the layout conversion system 200 include an edition module, an arrangement information storage module, a detection module, a generation module, an output module, a display module, and a layout information storage module. The programs or modules work on the CPU 3100 or the like to cause the computer 3000 to function as the editing unit 210, the arrangement information storage unit 220, the detection unit 230, the generation unit 240, the output unit 250, the display unit 260, and the layout information storage unit 270, respectively.

Information processing described in the programs is read by the computer 3000 to function as the editing unit 210, the arrangement information storage unit 220, the detection unit 230, the generation unit 240, the output unit 250, the display unit 260, and the layout information storage unit 270, which are concrete means in which software and the aforementioned various types of hardware resources are cooperatively working. Then, the layout conversion system 200 particularly suitable for the use purpose is constructed by the concrete means which implement arithmetic operation or manipulation of information depending on the use purpose of the computer 3000.

For example, when the computer 3000 communicates with an external device or the like, the CPU 3100 executes a communication program loaded into the RAM 3020 and instructs the communication interface 3030 to perform communication processing on the basis of the processing content described in the communication program. Under the control of the CPU 3100, the communication interface 3030 reads transmit data stored in a transmit buffer area or the like provided in a memory device such as the RAM 3020, the hard disk drive 3040, the flexible disk 3090, or the DVD 3095 and transmits the transmit data to the network or writes receive data received from the network into a receive buffer area or the like provided in the memory device. In this manner, the communication interface 3030 may transfer transmit and receive data to and from the memory device by the direct memory access (DMA) method. Alternatively, the CPU 3100 may read data from the memory device or the communication interface 3030, which is a source, and then write the data to the communication interface 3030 or the memory device, which is a destination, so as to transfer transmit and receive data.

In addition, the CPU 3100 causes all or a necessary part of a file or a data base stored in an external memory device, such as the hard disk drive 3040, the DVD drive 3060 (the DVD 3095), or the flexible disk drive 3050 (the flexible disk 3090), to be read into the RAM 3020 by means of a DMA transfer or the like so as to perform various types of processing for data in the RAM 3020. Then, the CPU 3100 writes the data completed to be processed back to the external memory device by means of a DMA transfer or the like. In such processing, since the RAM 3020 can be considered to temporarily store the content in the external memory device, in this embodiment, the RAM 3020, the external memory device, and the like are collectively called a memory, a memory unit, a memory device, or the like. Various types of programs and various types of information such as data, tables, and a database in this embodiment are stored in such a memory device and subjected to information processing. In addition, the CPU 3100 may store a part of data in the RAM 3020 in a cache memory and perform read and write operations on the cache memory. Even in such a case, since the cache memory undertakes some of the functions of the RAM 3020, in this embodiment, it is assumed that the cache memory is included in the RAM 3020, a memory, and/or a memory device, except where distinguished.

Moreover, the CPU 3100 performs, on data read from the RAM 3020, various types of processing specified by a string of instructions in a program, the various types of processing including various arithmetic operations, information manipulation, condition determination, and retrieval and replacement of information described in this embodiment. Then, the CPU 3100 writes the processed data back to the RAM 3020. For example, when performing condition determination, the CPU 3100 compares each of the various types of variables shown in this embodiment with another variable or a constant and determines whether a condition is satisfied, where the condition is such that, for example, the variable is more than, less than, equal to or more than, equal to or less than, or equal to the other variable or the constant. If the condition is satisfied (or not satisfied), the process branches to a different string of instructions or a subroutine is called.

The CPU 3100 is able to retrieve information stored in a file, a database, or the like in a memory device. For example, when a plurality of entries, in each of which the attribute value of a first attribute is associated with the attribute value of a second attribute, are stored in the memory device, the CPU 3100 is able to acquire the attribute value of the second attribute associated with the attribute value of the first attribute which satisfies a predetermined condition by retrieving an entry in which the attribute value of the first attribute satisfies the specified condition in the plurality of entries stored in the memory device and reading the attribute value of the second attribute stored in the entry.

The programs or modules which have been described may be stored in an external recording medium. Besides, the flexible disk 3090 and the DVD 3095, an optical recording medium such as a DVD or a CD, a magneto-optical recording medium such as an MO, a tape medium, or a semiconductor memory such as an IC card may be used as a recording medium. A memory device such as a hard disk or a RAM, provided in a server system connected to a private communication network or the Internet may be used as a recording medium, and the programs may be supplied to the computer 3000 via the network.

While the present invention has been described using the embodiments, the technical scope is not limited to the description of the aforementioned embodiments. It should be appreciated by persons skilled in the art that various modifications or improvements may be made in the aforementioned embodiments. It should be appreciated from the description and the claims that such embodiments, in which such modifications or improvements are made, also are covered by the technical scope of this specification. For example, the detection unit 230 may compare the amount based on the overlap width, the shift length, or the like of the display areas for the plurality of components with the number of reference pixels, instead of comparing the amount with the standard ratio.

It should be noted that, regarding the execution sequence of processes such as, for example, operations, procedures, steps, and stages in the devices, the systems, the programs, and the methods described in the claims, the specification, and the drawings, expression such as "before" and "preceding" is not explicitly given, and the devices, the systems, the programs, and the methods can be implemented with any sequence of processes unless the output of a preceding step is used by a following step. Even when operation flows in the claims, the specification, and the drawings are described using expression such as "first" and "next" for the sake of simplicity, this does not mean that such sequence is required.

As will be appreciated by one skilled in the art, one or more embodiments can be implemented as a system, method or computer program product. Accordingly, various embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, one or more embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing, e.g., a recording medium. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A layout converter for converting a layout of a display screen on which display areas for a plurality of software components are arranged, the layout converter comprising:
a processor, wherein the processor includes:
a detection unit configured to detect a plurality of target display areas having a predetermined arrangement relationship from the plurality of display areas; and
a generation unit configured to
select a container, from a plurality of types of containers, according to the arrangement relationship of the plurality of target display areas,
generate the selected container in which display contents of the plurality of target display areas are unified and displayed within one unified display area, and
add the container to the layout of the display screen, wherein
the selected container has a type associated with an identified condition for an arrangement relationship between two or more display areas.

2. The layout converter according to claim 1, wherein the detection unit detects the plurality of target display areas having a predetermined positional relationship from the plurality of display areas.

3. The layout converter according to claim 2, wherein the detection unit detects the plurality of target display areas, which are arranged with at least a part of sides to be boundaries of display areas aligned, from the plurality of display areas.

4. The layout converter according to claim 3, wherein:
the detection unit detects the plurality of target display areas, in which the display areas are arranged vertically with the left and right sides to be boundaries of the display areas aligned and constitute a plurality of columns and the top edges of the plurality of columns are aligned horizontally; and
the generation unit generates a portal container, in which the display contents of software components corresponding to the detected plurality of target display areas are displayed with being arranged in a plurality of columns within the unified display area, and adds the portal container to the layout of the display screen.

5. The layout converter according to claim 1, wherein:
the detection unit detects two or more display areas as the plurality of target display areas having a predetermined positional relationship in the case where the two or more display areas fill a rectangular area and sides to be boundaries are arranged so as to substantially border the sides of the adjacent display areas, respectively; and
the generation unit generates a split container, in which the display contents of the respective software components corresponding to the plurality of target display areas are displayed with being split into display parts corresponding to the plurality of target display areas, respectively, within the unified display area depending on the rectangular area and adds the split container to the layout of the display screen.

6. The layout converter according to claim 5, wherein the generation unit sets a boundary position of a display part to be unchangeable with respect to boundary lines corresponding to the sides each arranged so as to border the side of an adjacent target display area among the sides of the plurality of target display areas in the split container.

7. The layout converter according to claim 5, wherein the generation unit sets a boundary position of a display part to be changeable with respect to the boundary lines corresponding to the sides each arranged so as to overlap the side of an adjacent target display area among the sides of the plurality of target display areas in the split container.

8. The layout converter according to claim 1, wherein the detection unit detects the plurality of target display areas having a predetermined overlapping relationship from the plurality of display areas.

9. The layout converter according to claim 8, wherein:
the detection unit detects two or more display areas, which overlap by a predetermined first standard ratio or more with being shifted in one of the vertical direction and the horizontal direction, as the plurality of target display areas; and
the generation unit generates an accordion container, in which a plurality of tab sections are arranged in the one direction having a length extending in the other of the vertical direction and the horizontal direction so as to correspond to the plurality of target display areas and, when one of the tab sections is selected, the display content of the corresponding target display area is displayed between a selected tab section and the next tab section while hiding the display contents of the target display areas corresponding to tab sections not selected, and then the generation unit adds the accordion container to the layout of the display screen.

10. The layout converter according to claim 8, wherein:
the detection unit detects two or more display areas, which are arranged so as to overlap by a predetermined second standard ratio or more with being shifted, as the plurality of target display areas; and
the generation unit generates a tab container having a plurality of tab sections corresponding to the plurality of target display areas and a display section for displaying the display content of a target display area corresponding to a tab section selected from the plurality of tab sections and adds the tab container to the layout of the display screen.

11. The layout converter according to claim 10, wherein the generation unit arranges the plurality of tab sections in the vertical direction in the case where the direction of the arrangement in which the plurality of target display areas are arranged with being shifted is relatively close to the vertical direction and arranges the plurality of tab sections in the horizontal direction in the case where the direction of the arrangement is relatively close to the horizontal direction.

12. The layout converter according to claim 10, wherein the generation unit determines the order of the plurality of tab sections according to an overlap order of the plurality of target display areas.

13. The layout converter according to claim 1, wherein:
the detection unit detects and groups two or more display areas having a predetermined overlapping relationship from the plurality of display areas and detects and further groups the plurality of target display areas having a predetermined positional relationship from the grouped two or more display areas and other display areas; and
the generation unit generates a container, in which the display contents of the plurality of target display areas are unified and displayed within the unified display area with respect to each group, and adds the container to the layout of the display screen.

14. The layout converter according to claim 1, which is an editing device for editing the layout of the display screen for an application in which the plurality of software components are linked with each other, the layout converter further comprising:
an editing unit for arranging the plurality of display areas within the display screen in response to a user's instruction; and
an output unit for outputting information for displaying the layout of the display screen including the container generated by the generation unit.

15. A computer program product, comprising:
a computer readable storage medium having computer readable program code embodied therewith for converting a layout of a display screen on which display areas for a plurality of software components are arranged, the computer readable program code, which when executed by a computer hardware system, causes the computer hardware system to:
detect a plurality of target display areas having a predetermined arrangement relationship from the plurality of display areas;
select a container, from a plurality of types of containers, according to the arrangement relationship of the plurality of target display areas;
generate a container, in which display contents of the plurality of target display areas are unified and displayed within one unified display area; and
add the container to the layout of the display screen, wherein
the selected container has a type associated with an identified condition for an arrangement relationship between two or more display areas.

16. The computer program product of claim 15, wherein
the computer readable program code configured to detect a plurality of target display areas further comprises computer readable program code configured to detect the plurality of target display areas having a predetermined positional relationship from the plurality of display areas.

17. The computer program product of claim 15, wherein
the computer readable program code configured to detect a plurality of target display areas further comprises computer readable program code configured to detect the plurality of target display areas having a predetermined overlapping relationship from the plurality of display areas.

18. A method of layout conversion, comprising:
detecting a plurality of target display areas having a predetermined arrangement relationship from a plurality of display areas arranged on a display screen;
selecting a container, from a plurality of types of containers, according to the arrangement relationship of the plurality of target display areas;
generating a container, in which display contents of the plurality of target display areas are unified and displayed within one unified display area; and
adding the container to the layout of the display screen, wherein
the plurality of display areas correspond to respective ones of a plurality of software components, and
the selected container has a type associated with an identified condition for an arrangement relationship between two or more display areas.

19. The method according to claim 18, further comprising
detecting the plurality of target display areas having a predetermined overlapping relationship from the plurality of display areas.

20. A system comprising:
a memory configured to store computer readable program code for layout conversion;
a central processing unit coupled to the memory, wherein the central processing unit, responsive to executing the computer readable program code, performs:
detecting a plurality of target display areas having a predetermined arrangement relationship from a plurality of display areas arranged on a display screen;
selecting a container, from a plurality of types of containers, according to the arrangement relationship of the plurality of target display areas;
generating a container, in which display contents of the plurality of target display areas are unified and displayed within one unified display area; and
adding the container to the layout of the display screen, wherein
the plurality of display areas correspond to respective ones of a plurality of software components, and the selected container has a type associated with an identified condition for an arrangement relationship between two or more display areas.

\* \* \* \* \*